(12) United States Patent
Zhang et al.

(10) Patent No.: US 12,563,214 B2
(45) Date of Patent: Feb. 24, 2026

(54) CASCADING AND PARALLEL PROCESSING OF AFFINE DMVR VIDEO CODING TOOLS

(71) Applicant: QUALCOMM Incorporated, San Diego, CA (US)

(72) Inventors: Yan Zhang, San Diego, CA (US); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 50 days.

(21) Appl. No.: 18/602,082

(22) Filed: Mar. 12, 2024

(65) Prior Publication Data
US 2024/0314342 A1 Sep. 19, 2024

Related U.S. Application Data

(60) Provisional application No. 63/490,872, filed on Mar. 17, 2023.

(51) Int. Cl.
*H04N 19/436* (2014.01)
*H04N 19/105* (2014.01)
(Continued)

(52) U.S. Cl.
CPC ......... *H04N 19/436* (2014.11); *H04N 19/105* (2014.11); *H04N 19/139* (2014.11);
(Continued)

(58) Field of Classification Search
CPC ........................... H04N 19/436; H04N 19/105
See application file for complete search history.

(56) References Cited

U.S. PATENT DOCUMENTS

| 10,778,999 B2 * | 9/2020 | Li | H04N 19/70 |
| 11,197,003 B2 * | 12/2021 | Zhang | H04N 19/109 |

(Continued)

FOREIGN PATENT DOCUMENTS

| WO | 2023278964 A1 | 1/2023 |

OTHER PUBLICATIONS

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

(Continued)

*Primary Examiner* — Irfan Habib
(74) *Attorney, Agent, or Firm* — Shumaker & Sieffert, P.A.

(57) ABSTRACT

A device for decoding video data can be configured to determine that a block of the video data is coded in an affine prediction mode; determine a plurality of control point motion vectors (CPMVs) for the affine prediction mode; perform two or more DMVR processes on the CPMVs to determine two or more sets of refined CPMVs, wherein to performing the two or more DMVR processes on the CPMVs to determine the two or more sets of refined CPMVs, the one or more processors are further configured to perform two or more of bilateral matching-based affine DMVR, regression-based DMVR, affine model parameter refinement, affine DMVR CPMV searching, or affine DMVR CPMV search refinement; perform a cost comparison between the two or more DMVR processes to select a set of refined CPMVs from the refined CPMVs; and determine a prediction block for the block based on the set of refined CPMVs.

20 Claims, 17 Drawing Sheets

(51) Int. Cl.

| | |
|---|---|
| *H04N 19/139* | (2014.01) |
| *H04N 19/159* | (2014.01) |
| *H04N 19/176* | (2014.01) |
| *H04N 19/52* | (2014.01) |
| *H04N 19/527* | (2014.01) |

(52) U.S. Cl.
CPC ......... *H04N 19/159* (2014.11); *H04N 19/176* (2014.11); *H04N 19/52* (2014.11); *H04N 19/527* (2014.11)

(56) References Cited

U.S. PATENT DOCUMENTS

| | | | |
|---|---|---|---|
| 2018/0270500 A1* | 9/2018 | Li ............................ | H04N 19/52 |
| 2019/0158870 A1* | 5/2019 | Xu ......................... | H04N 19/513 |
| 2020/0120335 A1* | 4/2020 | Hung ................... | H04N 19/513 |
| 2020/0359039 A1* | 11/2020 | Zhao .................... | H04N 19/423 |
| 2020/0359049 A1* | 11/2020 | Zhao ..................... | H04N 19/43 |
| 2021/0029362 A1 | 1/2021 | Liu et al. | |
| 2021/0051329 A1* | 2/2021 | Ko ........................ | H04N 19/119 |
| 2022/0078475 A1* | 3/2022 | Paluri .................... | H04N 19/13 |
| 2022/0116587 A1* | 4/2022 | Zhao ...................... | H04N 19/52 |
| 2022/0329823 A1 | 10/2022 | Chen et al. | |
| 2024/0022729 A1 | 1/2024 | Huang et al. | |
| 2024/0121426 A1 | 4/2024 | Huang et al. | |
| 2024/0137539 A1* | 4/2024 | Li ........................... | H04N 19/54 |
| 2024/0291997 A1* | 8/2024 | Zhang ................. | H04N 19/107 |
| 2025/0126244 A1* | 4/2025 | Zhang ................. | H04N 19/176 |

OTHER PUBLICATIONS

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

International Search Report and Written Opinion—PCT/US2024/019631—ISA/EPO—Jun. 18, 2024 12 Pages.

Seregin V (EE Coordinators)., et al., "Exploration Experiment on Enhanced Compression Beyond VVC Capability (EE2)," Joint Video Experts Team (JVET) of ITU-T SG 16 WP 3 and ISO/IEC JTC 1/SC 29, JVET-AB2024-v3, 28th Meeting: Mainz, DE, Oct. 20, 2022-Oct. 28, 2022, No. JVET-AB2024, m61491, Nov. 29, 2022, 20 Pages, XP030306276, Tests 2.1-2.3.

\* cited by examiner

**refPic in List *L1*     Current Picture     refPic in List *L0***

1

CASCADING AND PARALLEL PROCESSING OF AFFINE DMVR VIDEO CODING TOOLS

This application claims the benefit of U.S. Provisional Patent Application No. 63/490,872, filed 17 Mar. 2023, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

According to an example of this disclosure, a method of decoding video data includes determining that a block of the video data is coded in an affine prediction mode; determining a plurality of control point motion vectors (CPMVs) for the affine prediction mode; performing two or more DMVR processes on the CPMVs to determine two or more sets of refined CPMVs, wherein performing the two or more DMVR processes on the CPMVs to determine the two or more sets of refined CPMVs comprises performing two or more of bilateral matching-based affine DMVR, regression-based DMVR, affine model parameter refinement, affine DMVR CPMV searching, or affine DMVR CPMV search refinement; performing a cost comparison between the two or more DMVR processes to select a set of refined CPMVs from the refined CPMVs; and determining a prediction block for the block based on the set of refined CPMVs.

According to an example of this disclosure, a device for decoding video data includes a memory configured to store video data and one or more processors implemented in circuitry and configured to: determine that a block of the video data is coded in an affine prediction mode; determine a plurality of control point motion vectors (CPMVs) for the affine prediction mode; perform two or more DMVR processes on the CPMVs to determine two or more sets of refined CPMVs, wherein to performing the two or more DMVR processes on the CPMVs to determine the two or more sets of refined CPMVs, the one or more processors are further configured to perform two or more of bilateral matching-based affine DMVR, regression-based DMVR, affine model parameter refinement, affine DMVR CPMV searching, or affine DMVR CPMV search refinement; perform a cost comparison between the two or more DMVR processes to select a set of refined CPMVs from the refined CPMVs; and determine a prediction block for the block based on the set of refined CPMVs.

A computer-readable storage medium stores instructions that when executed by one or more processors cause the one or more processors to determine that a block of video data is coded in an affine prediction mode; determine a plurality of control point motion vectors (CPMVs) for the affine prediction mode; perform two or more DMVR processes on the CPMVs to determine two or more sets of refined CPMVs, wherein to performing the two or more DMVR processes on the CPMVs to determine the two or more sets of refined CPMVs, the one or more processors are further configured to perform two or more of bilateral matching-based affine DMVR, regression-based DMVR, affine model parameter refinement, affine DMVR CPMV searching, or affine DMVR CPMV search refinement; perform a cost comparison between the two or more DMVR processes to select a set of refined CPMVs from the refined CPMVs; and determine a prediction block for the block based on the set of refined CPMVs.

The details of one or more examples are set forth in the accompanying drawings and the description below. Other features, objects, and advantages will be apparent from the description, drawings, and claims.

DETAILED DESCRIPTION

Video coding (e.g., video encoding and/or video decoding) typically involves predicting a block of video data from either an already coded block of video data in the same picture (i.e., intra prediction) or an already coded block of video data in a different picture (i.e., inter prediction). In some instances, the video encoder also calculates residual data by comparing the predictive block to the original block. Thus, the residual data represents a difference between the predictive block and the original block. The video encoder transforms and quantizes the residual data and signals the transformed and quantized residual data in the encoded bitstream. A video decoder adds the residual data to the predictive block to produce a reconstructed video block that matches the original video block more closely than the predictive block alone. To further improve the quality of decoded video, a video decoder can perform one or more filtering operations on the reconstructed video blocks, such as deblock filtering, sample adaptive offset (SAO) filtering, and adaptive loop filtering (ALF).

This disclosure describes techniques associated with inter prediction and, more specifically, techniques associated with decoder-side motion vector refinement (DMVR) for affine prediction. Typically, video coders are configured to determine control point motion vectors (CPMVs) and to refine the CPMVs by performing affine DMVR processes, such as bilateral matching-based affine DMVR, regression-based DMVR, affine model parameter refinement, affine DMVR CPMV searching, or affine DMVR CPMV search refinement sequentially. When performing these DMVR processes sequentially, the output of one process is used as the input for a subsequent process. For example, the output of bilateral matching-based affine DMVR may be used as the input for affine DMVR based regression. Performing these processes sequentially, however, can be time consuming and computationally complex. This disclosure describes techniques for performing some or all of the affine DVMR processes in parallel and then using a cost comparison to select refined CPMVs.

By performing one or more of bilateral matching-based affine DMVR, regression-based DMVR, affine model parameter refinement, affine DMVR CPMV searching, or affine DMVR CPMV search refinement in parallel, the techniques of this disclosure may reduce complexity and enable a video coder to perform more parallel processing. By using a cost comparison to select from multiple refined CPMV outputs, the techniques of this disclosure may achieve this complexity reduction and improved parallelism with little or no effect on coding quality.

Figure 1:
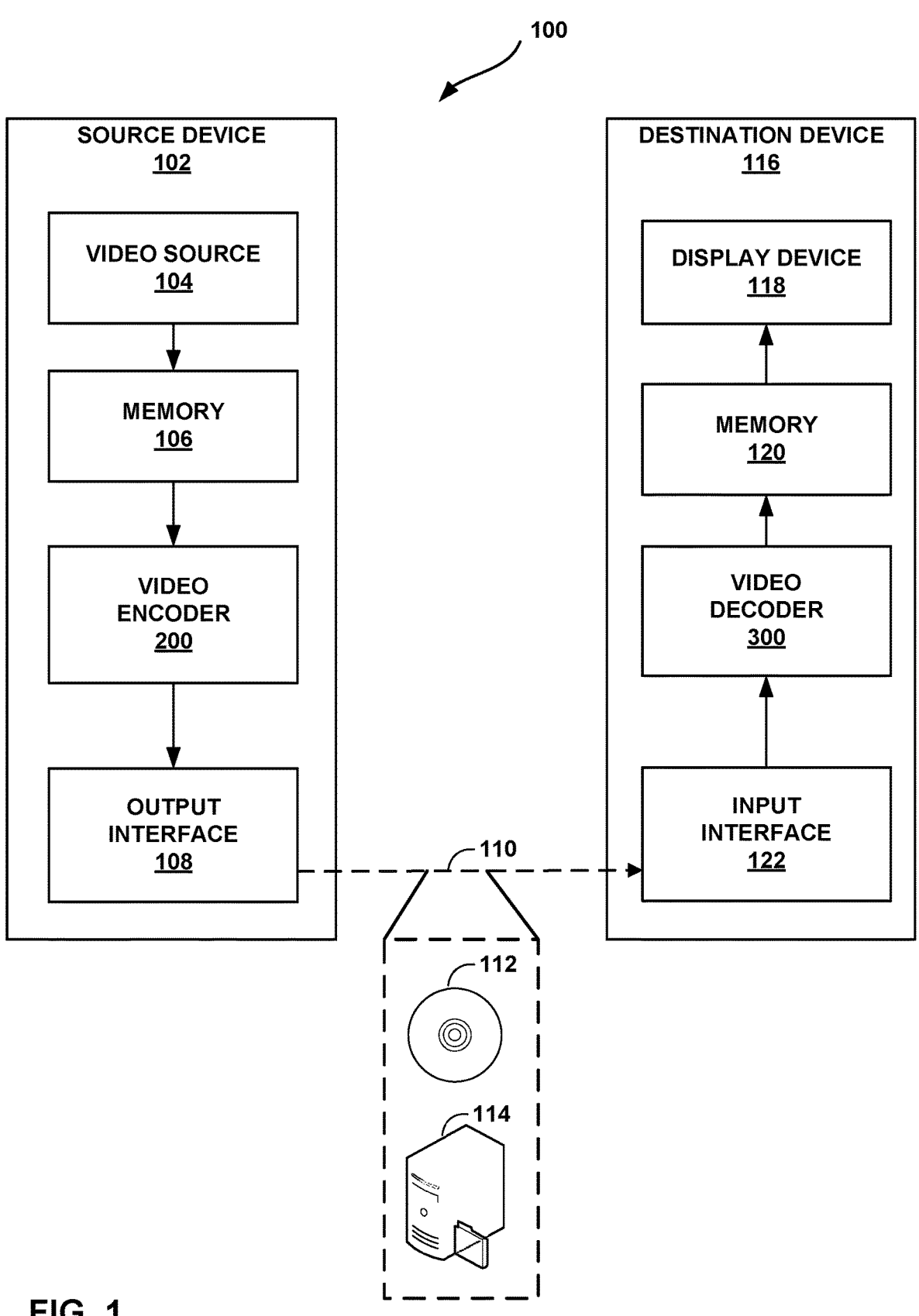
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for affine DMVR described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for affine DMVR described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use affine DMVR.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. A 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Video encoder 200 and video decoder 300 may be configured to code video blocks in an affine mode. An affine motion model, used for the affine mode, may be described as follows:

$$\begin{cases} v_x = ax + by + e \\ v_y = cx + dy + f \end{cases}$$

where $(v_x, v_y)$ is the motion vector at the coordinate (x, y), and a, b, c, d, e, and f are the six affine parameters. The affine motion model above will be referred to as a 6-parameters affine motion model. In a typical video coder, a picture is partitioned into blocks for block-based coding. The affine motion model for a block can also be described by the three motion vectors (MVs) $\vec{v}_0 = (v_{0x}, v_{0y})$, $\vec{v}_1 = (v_{1x}, v_{1y})$, and $\vec{v}_2 = (v_{2x}, v_{2y})$ at three different locations that are not in the same line. The three locations are usually referred to as control-points, and the three motion vectors are referred to as control-point motion vectors (CPMVs). In the case where the three control-points are at the three corners of the block, the affine motion may be described as:

$$\begin{cases} v_x = \dfrac{(v_{1x} - v_{0x})}{blkW}x + \dfrac{(v_{2x} - v_{0x})}{blkH}y + v_{0x} \\ v_y = \dfrac{(v_{1y} - v_{0y})}{blkW}x + \dfrac{(v_{2y} - v_{0y})}{blkH}y + v_{0y} \end{cases}$$

where blkW and blkH are the width and height of the block.

In affine mode, video encoder 200 and video decoder 300 may derive different motion vectors for each pixel in the block according to the associated affine motion model. Therefore, motion compensation may be performed pixel-by-pixel. However, to reduce the complexity, subblock-based motion compensation is sometimes adopted, where the block is partitioned into multiple subblocks (that have smaller block size), and each subblock is associated with one motion vector for block-based motion compensation. Video encoder 200 and video decoder 300 derive the motion vector for each subblock using the representative coordinate of the subblock. Typically, the center position is used. In one example, the block is partitioned into non-overlapping subblocks. The block width is blkW, block height is blkH, the subblock width is sbW and subblock height is sbH, then there's blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column is derived as:

$$\begin{cases} v_x = \dfrac{(v_{1x} - v_{0x})}{blkW}\left(j*sbW + \dfrac{sbW}{2}\right) + \dfrac{(v_{2x} - v_{0x})}{blkH}\left(i*sbH + \dfrac{sbH}{2}\right) + v_{0x} \\ v_y = \dfrac{(v_{1y} - v_{0y})}{blkW}\left(j*sbW + \dfrac{sbW}{2}\right) + \dfrac{(v_{2y} - v_{0y})}{blkH}\left(i*sbH + \dfrac{sbH}{2}\right) + v_{0y} \end{cases}$$

Video encoder 200 and video decoder 300 may round the subblock MVs to the predefined precision and store the rounded MVs in the motion buffer for motion compensation and motion vector prediction.

A simplified 4-parameters affine model (for zoom and rotational motion) is described as follows:

$$\begin{cases} v_x = ax - by + e \\ v_y = bx + ay + f \end{cases}$$

Similarly, the 4-parameters affine model for a block may be described by two CPMVs $\vec{v}_0 = (v_{0x}, v_{0y})$ and $\vec{v}_1 = (v_{1x},$ $v_{1y}$) at the two corners (typically top-left and top-right) of the block. The motion field is then described as $$\begin{cases} v_x = \dfrac{(v_{1x} - v_{0x})}{blkW}x - \dfrac{(v_{1y} - v_{0y})}{blkW}y + v_{0x} \\ v_y = \dfrac{(v_{1y} - v_{0y})}{blkW}x + \dfrac{(v_{1x} - v_{0x})}{blkW}y + v_{0y} \end{cases}$$

The subblock MV at $i_{th}$ row and $j_{th}$ column is derived as:

$$\begin{cases} v_x = \dfrac{(v_{1x} - v_{0x})}{blkW}\left(j*sbW + \dfrac{sbW}{2}\right) - \dfrac{(v_{1y} - v_{0y})}{blkW}\left(i*sbH + \dfrac{sbH}{2}\right) + v_{0x} \\ v_y = \dfrac{(v_{1y} - v_{0y})}{blkW}\left(j*sbW + \dfrac{sbW}{2}\right) + \dfrac{(v_{1x} - v_{0x})}{blkW}\left(i*sbH + \dfrac{sbH}{2}\right) + v_{0y} \end{cases}$$

Video encoder 200 and video decoder 300 may be configured to perform prediction refinement for affine mode. After the subblock-based affine motion compensation is performed, the prediction signal may be refined by adding an offset derived based on the pixel-wise motion and the gradient of the prediction signal. The offset at location (m, n) may be calculated as:

$$\Delta I(m, n) = g_x(m, n) * \Delta v_x(m, n) + g_y(m, n) * \Delta v_y(m, n)$$

where $g_x(m, n)$ is the horizontal gradient and $g_y(m, n)$ is the vertical gradient of the prediction signal, respectively. $\Delta v_x(m, n)$ and $\Delta v_y(m, n)$ are the differences in x and y components between the motion vector calculated at location pixel location (m, n) and the subblock MV. The coordinate of the top-left sample of the subblock may be represented as (0,0), and the center of the subblock may be $$\left(\dfrac{sbW}{2}, \dfrac{sbH}{2}\right).$$

Given the affine motion parameters a, b, c, and d, $\Delta v_x(m, n)$ and $\Delta v_y(m, n)$ may be derived as:

$$\Delta v_x(m, n) = a*\left(m - \dfrac{sbW}{2}\right) + b*\left(n - \dfrac{sbH}{2}\right)$$

$$\Delta v_y(m, n) = c*\left(m - \dfrac{sbW}{2}\right) + d*\left(n - \dfrac{sbH}{2}\right)$$

In the control-points-based affine motion model, the affine motion parameters a, b, c, and d are calculated from the CPMVs as:

$$a = \dfrac{(v_{1x} - v_{0x})}{blkW}$$

$$b = \dfrac{(v_{2x} - v_{0x})}{blkH}$$

$$c = \dfrac{(v_{1y} - v_{0y})}{blkW}$$

$$d = \dfrac{(v_{2y} - v_{0y})}{blkH}$$

Figure 2:
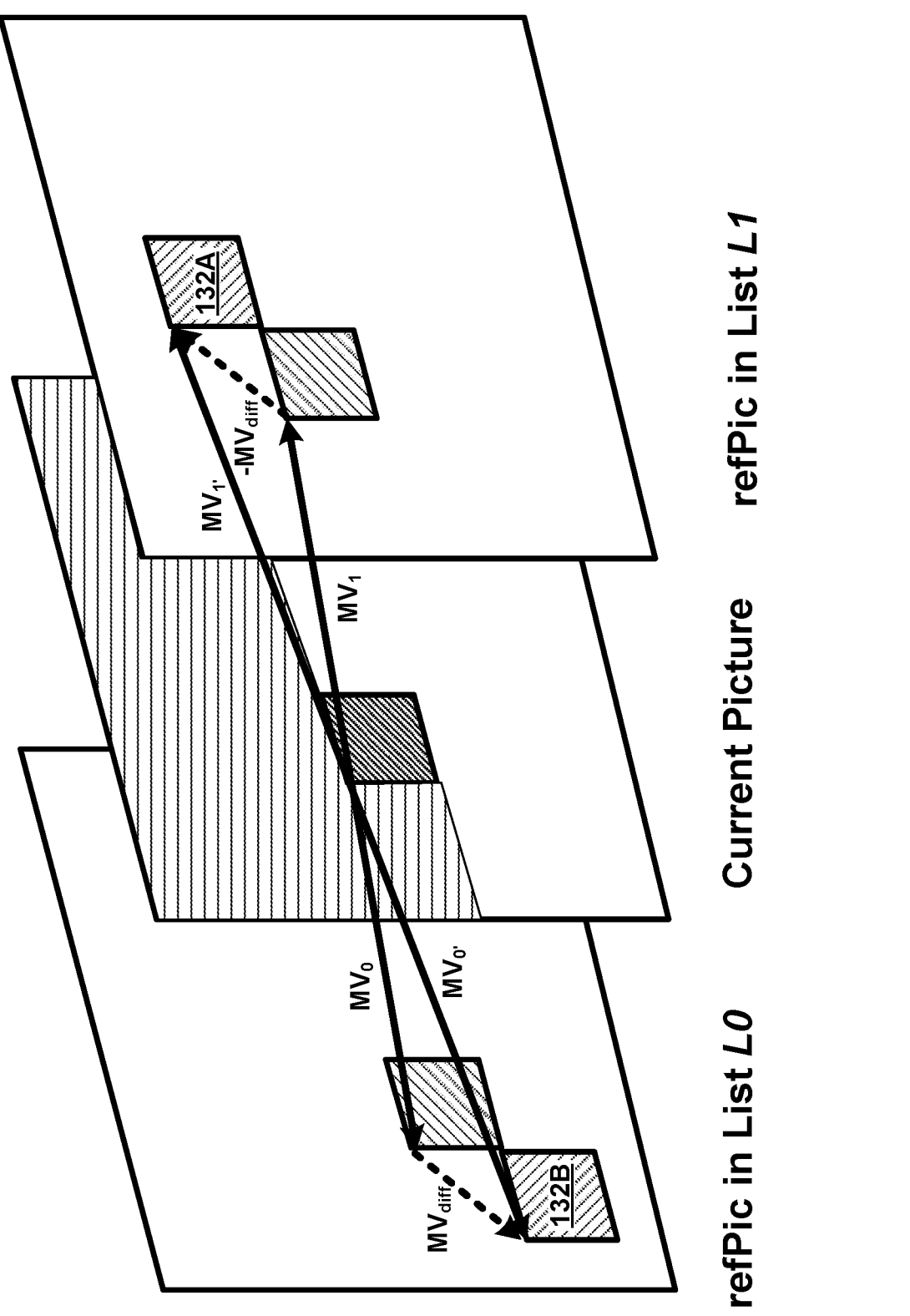
FIG. 2 shows an example of bilateral matching.

Video encoder 200 and video decoder 300 may be configured to perform DMVR. In VVC, the bilateral matching (BM) based DMVR may be applied to increase the accuracy of the MVs of a bi-prediction merge candidate. For the BM process, video encoder 200 and video decoder 300 calculate the SAD between the two candidate blocks in the reference picture list L0 and list L1. As illustrated in FIG. 2, the SAD between blocks 132A and 132B, based on each MV candidate around the initial MV, is calculated. The MV candidate with the lowest SAD becomes the refined MV and is used to generate the bi-predicted signal. The SAD of the initial MVs is subtracted by ¼ of the SAD value to serve as regularization term. The temporal distances (e.g., Picture Order Count (POC) difference) from two reference pictures to the current picture shall be the same, therefore, the MVD0 is just the opposite sign of MVD1.

The refinement search range is two integer luma samples from the initial MV. The searching includes the integer sample offset search stage and fractional sample refinement stage 25 points full search is applied for integer sample offset searching. The SAD of the initial MV pair is first calculated. If the SAD of the initial MV pair is smaller than a threshold, the integer sample stage of DMVR is terminated. Otherwise, SADs of the remaining 24 points are calculated and checked in raster scanning order. The point with the smallest SAD is selected as the output of integer sample offset searching stage.

Video encoder 200 and video decoder 300 may follow the integer sample search with fractional sample refinement. To save the calculational complexity, video encoder 200 and video decoder 300 may derive the fractional sample refinement using parametric error surface equation, instead of additional search with SAD comparison. The fractional sample refinement may be conditionally invoked based on the output of the integer sample search stage. When the integer sample search stage is terminated with a center having the smallest SAD in either the first iteration or the second iteration search, the fractional sample refinement is further applied.

In parametric error surface based sub-pixel offsets estimation, video encoder 200 and video decoder 300 may determine the center position cost and the costs at four neighboring positions from the center to fit a 2-D parabolic error surface equation of the following form:

$$E(x, y) = A(x - x_{min})^2 + B(y - y_{min})^2 + C \qquad (1)$$

where ($x_{min}$, $y_{min}$) corresponds to the fractional position with the least cost and C corresponds to the minimum cost value. By solving the above equations by using the cost value of the five search points, ($x_{min}$, $y_{min}$) is computed as:

$$x_{min} = (E(-1, 0) - E(1, 0))/(2(E(-1, 0) + E(1, 0) - 2E(0, 0))) \qquad (2)$$

$$y_{min} = (E(0, -1) - E(0, 1))/(2((E(0, -1) + E(0, 1) - 2E(0, 0))) \qquad (3)$$

The value of $x_{min}$ and $y_{min}$ may be automatically constrained to be between −8 and 8, as all cost values are positive and the smallest value is E (0,0). This corresponds to a half pel offset with $\frac{1}{16}^{th}$-pel MV accuracy in VVC. The computed fractional ($x_{min}$, $y_{min}$) are added to the integer distance refinement MV to get the sub-pixel accurate refinement delta MV.

In VVC, the resolution of the MVs is $\frac{1}{16}$ luma samples. The samples at the fractional position are interpolated using an 8-tap interpolation filter. In DMVR, the search points surround the initial fractional-pel MV with an integer sample offset. Therefore, the samples of those fractional position may need to be interpolated for a DMVR search process. To reduce the calculation complexity, a bi-linear interpolation filter may used to generate the fractional samples for the searching process in DMVR. By using a bi-linear filter, with a 2-sample search range, the DVMR does not access more reference samples compared to the normal motion compensation process. After the refined MV is attained with a DMVR search process, the normal 8-tap interpolation filter is applied to generate the final prediction. In order to not access more reference samples than the normal MC process, the samples, which are not needed for the interpolation process based on the original MV but are needed for the interpolation process based on the refined MV may be padded from available samples.

When the width and/or height of a CU are larger than 16 luma samples, then the CU may be further split into sub-blocks with width and/or height equal to 16 luma samples for the DMVR process.

In VVC, the DMVR may be applied for the CUs which are coded with the following modes and features:

CU level merge mode with bi-prediction MV
  One reference picture is in the past and another reference picture is in the future with respect to the current picture
  The distances (e.g., POC difference) from two reference pictures to the current picture are same
  Both reference pictures are short-term reference pictures
  CU has more than 64 luma samples
  Both CU height and CU width are larger than or equal to 8 luma samples
  BCW weight index indicates equal weight
  WP is not enabled for the current block
  CIIP mode is not used for the current block Video encoder 200 and video decoder 300 may be configured to perform DMVR for affine merge mode. In JVET-AA0144, DMVR is proposed for bi-directional predicted affine merge candidates. A translation MV offset is added to all the CPMVs of the candidate in the affine merge list if the candidate meets the DMVR condition. The MV offset is derived by minimizing the cost of BM, which is similar to the conventional DMVR. The difference is that the affine motion compensation is performed to generate predictors in both directions. The MV offset searching process is the same as the first pass of multi-pass DMVR (prediction unit level) in ECM. A 3×3 square search pattern is used to loop through the search range [−8, +8] in a horizontal direction and [−8, +8] in a vertical direction to find the best integer MV offset. A half pel search may then be conducted around the best integer position, and an error surface estimation may be performed to find a MV offset with $\frac{1}{16}$ precision.

To calculate the BM cost (for the given bi-directional affine motion), video encoder 200 and video decoder 300 may be configured to perform the following steps:

1) The offset is first added to each of the CPMVs in both directions to update the CPMVs.
  2) Affine motion compensation is applied according to the updated CPMVs to generate the predictors in both directions.
  3) Calculate the distortion between the generated predictors using the predefined cost criterion.

Typically, the affine motion compensation is subblock based, such that the current block is partitioned into non-overlapping subblocks. Regular motion compensation may be performed for each subblock, and all samples in the subblock share the same motion. In VVC, prediction refinement with optical flow (PROF) may be applied after the subblock based motion compensation to further improve the predictor.

In U.S. Provisional Patent Application No. 63/368,576, filed 15 Jul. 2022, a less complex and more practical DMVR design for affine motion model was disclosed. This DMVR design may be summarized in the following steps:

1) Divide the current block into subblocks.
2) Generate initial motion vectors (of both prediction directions) for each subblock (subblock motion fields) according to the initial affine motion model.
3) Loop over each subblock, calculate subblock BM cost for all possible offsets.
4) For each possible offset, accumulate the subblock BM cost to generate the BM cost corresponding to the entire block.
5) Determine the best offset by selecting the one with minimum BM cost corresponding to the entire block.

In U.S. Provisional Patent Application No. 63/377,659, filed 29 Sep. 2022, subblock skipping or subsampling is disclosed to further reduce the complexity by using a subset of subblocks during the affine DMVR process.

Video encoder 200 and video decoder 300 may be configured to perform regression-based DMVR for affine merge mode. In ECM6.0, linear regression-based affine merge candidate derivation process proposed in JVET-AA0107 was adopted. In the proposal, a linear regression process is applied to derive the affine motion model. The input to the linear regression is motion information and corresponding coordinates from a set of previously coded subblocks.

The objective of linear regression is to use the independent variables whose values are known to predict the value of the single dependent value which is unknown. Each predictor value is weighed, with the weights denoting their relative contribution to the overall prediction and added up to form the prediction. A General model for multivariate linear regression is given by $Y=a+b_1X_1+b_2X_2+ \ldots +b_nX_n$.

Y is the dependent variable, and $X_1, \ldots, X_n$ are the n independent variables. In calculating the weights a, $b_1, \ldots$, $b_n$, the least square approach is applied so that the mean square error between the statistical observation samples and the estimated value is minimized.

The affine motion model may be equivalently represented by two linear equations in matrix form as:

$$\begin{pmatrix} v_x \\ v_y \end{pmatrix} = \begin{pmatrix} a & b & e \\ c & d & f \end{pmatrix} \begin{pmatrix} x \\ y \\ 1 \end{pmatrix}$$

It may be assumed that an affine motion model is essentially a linear equation of coordinates with certain coefficients.

Given a set of N subblocks with corresponding motion vectors $(v_x, v_y)$ and coordinates (x, y), the linear coefficients $$\begin{pmatrix} a & b & e \\ c & d & f \end{pmatrix}$$

may be solved by linear regression. Details of the linear regression process can be found in U.S. Provisional Patent Application No. 63/366,106 filed 9 Jun. 2022 and R. Ghaznavi-Youvalarim, A. Aminlou and J. Lainema, "Regression-Based Motion Vector Field for Video Coding," IEEE Transactions on Circuits and Systems for Video Technology Volume: 31, Issue: 5, May 2021.

As described above with respect to DMVR for affine merge mode, during the subblock based affine DMVR process, video encoder 200 and video decoder 300 may be configured to determine a BM cost per subblock for all possible motion vector offsets. Therefore, it is possible to decide the best subblock motion vector offset for each of the subblock independently in parallel to decide the global offset for all CPMVs. With the refined motion vectors $(v_x, v_y)$ and the corresponding coordinates (x, y), video encoder 200 and video decoder 300 may apply linear regression to derive a new set of CPMVs as the refined affine merge candidate.

Figure 3:
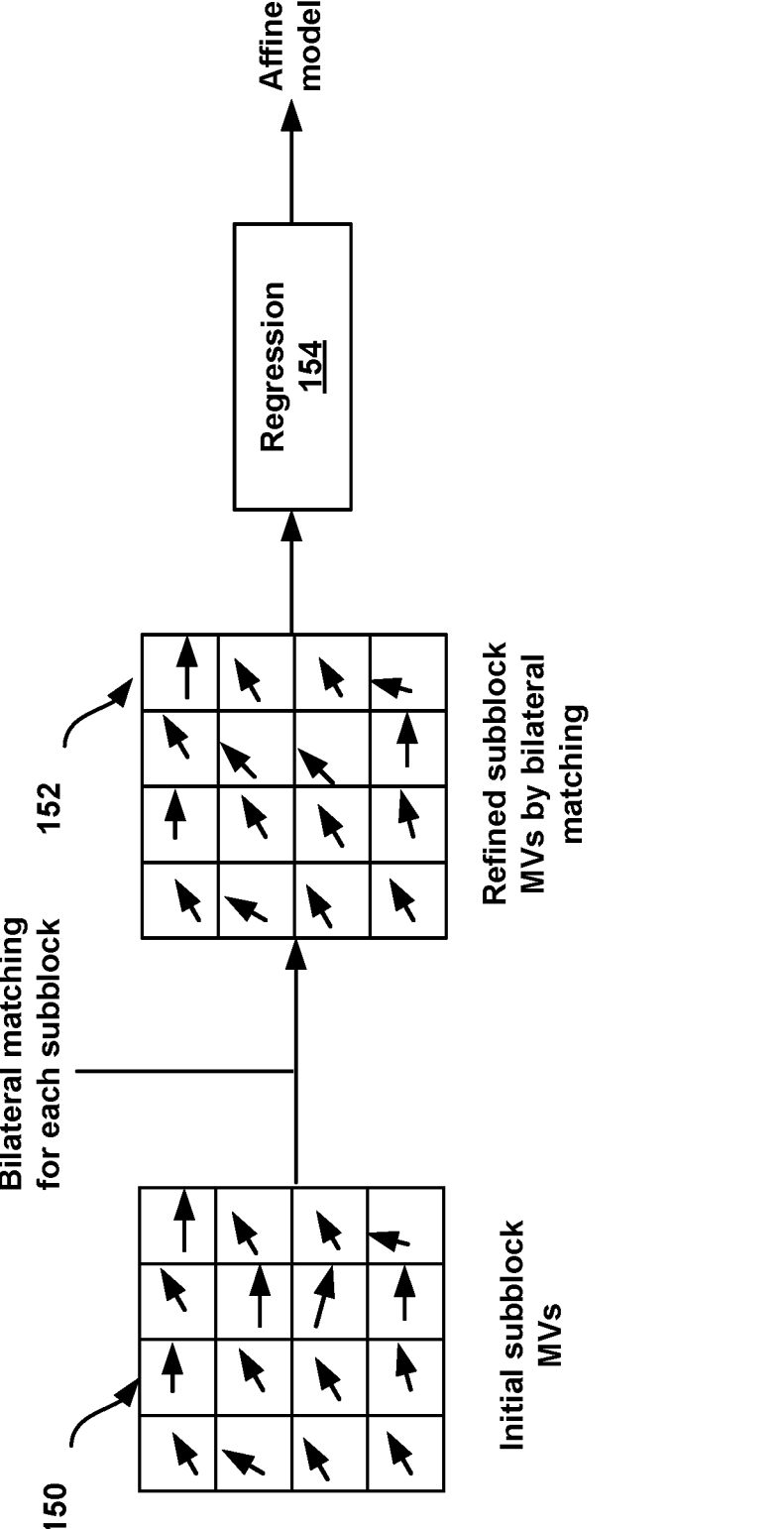
FIG. 3 shows an example of an overall illustration of the regression-based decoder side affine derivation process.

The affine DMVR regression process is illustrated in FIG. 3. A coding block 150 is partition into subblocks, and corresponding initial subblock MVs are generated, typically from the initial motion information for the coding block. The MVs are represented by the arrows in FIG. 3. Bilateral matching-based affine DMVR is performed for each subblock to generate a set of refined MVs. The set of refined MVs are represented by the arrows in block 152, some of which may be slightly different than the corresponding initial MV in block 150. The refined MVs and the corresponding coordinates of those subblocks are used as input for the linear regression process 154. The output of linear regression process 154 is the derived affine motion model.

Video encoder 200 and video decoder 300 may be configured to perform affine model parameters refinement with affine DMVR.

As introduced above, an affine motion model may be described as:

$$\begin{cases} v_x = ax + by + e \\ v_y = cx + dy + f \end{cases}$$

The affine parameters are derived from the CPMVs as follows:

$$\begin{cases} a = \dfrac{mv_{1x} - mv_{0x}}{width} \\ b = \dfrac{mv_{2x} - mv_{0x}}{height} \\ c = \dfrac{mv_{1y} - mv_{0y}}{width} \\ d = \dfrac{mv_{2y} - mv_{0y}}{height} \end{cases}$$

In some examples, when the affine merge candidates are refined in the manner described above for DMVR for affine merge mode and where the same offset is being added to all the CPMVs, video encoder 200 and video decoder 300 may refine only the translational affine parameter e and f, and the other non-translational affine parameters a, b, c and d remain unchanged. The affine model parameters refinement is refined with affine DMVR as described below.

Figures 4A, 4B, 4C:
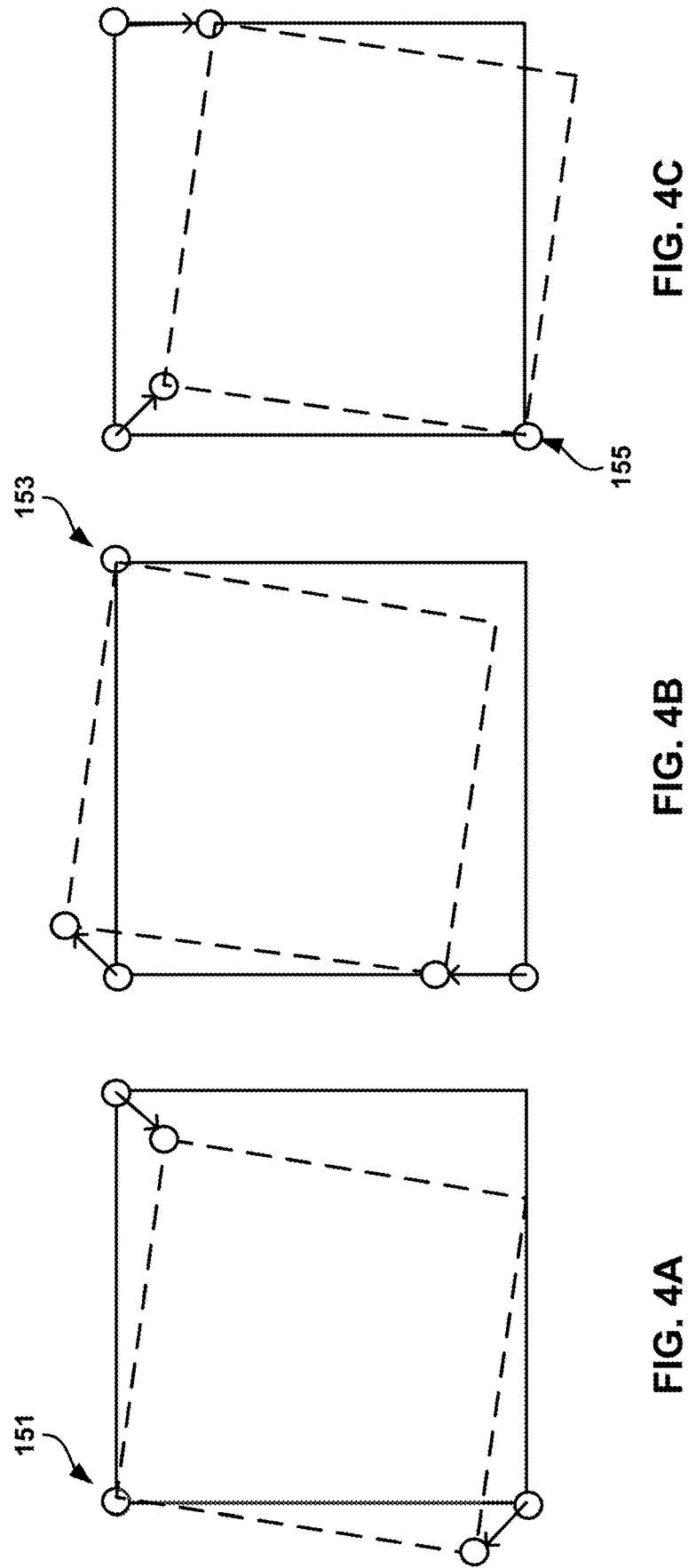
FIGS. 4A-4C show examples of the three stages of non-translation affine parameters search.

The search process has three stages. In the first stage as shown in FIG. 4A, the top-left CPMV 151 is fixed as a base MV of the affine model, and the parameters a, b, c and d are jointly searched with a cross pattern to find best values by minimizing the cost of BM. Then CPMVs are recalculated with the refined parameter values of a, b, c and d. In the second stage as shown in FIG. 4B, the new top-right CPMV 153 is fixed as the base MV, and the parameters a, b, c and d are jointly searched again to find new best values. CPMVs are recalculated again after the search. In the third stage as shown in FIG. 4C, the new left-bottom CPMV 155 is fixed as the base MV and the same search process is applied on parameters a, b, c and d once again to get the final refined model. For 4-parameter affine model, only parameters a and b need to be refined and the search process itself is the same as that for 6-parameter affine model. For each search point in the search process, motion compensation is applied for the whole CU and the SAD between two predictors of the CU are used as the cost.

Figure 5:
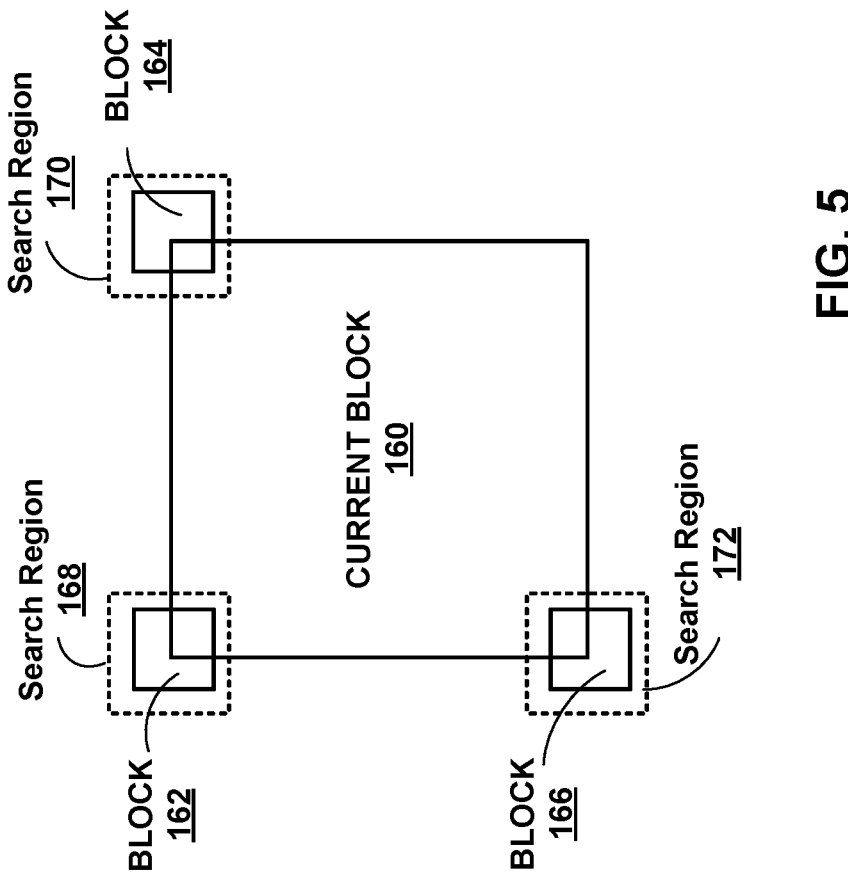
FIG. 5 shows an example of independent search for control point motion vectors (CPMVs).

Video encoder 200 and video decoder 300 may be configured to perform affine DMVR CPMV search. In this process, each CPMV for current block 160 may be independently refined by regular DMVR (e.g., BM) of a representative block. As illustrated in FIG. 5, each CPMV, e.g., the CPMVs for blocks 162, 164, and 166, is searched within a predefined search area based on a BM of the representative block. For example, in FIG. 5, each of blocks 162, 164, and 166 is searched within search region 168, 170, and 172, respectively. The representative block may be a block that contains the CPMV location. The block can be a block that has the CPMV location as its center, e.g., the coordinates of the top-left sample of the block is (xk-halfDx, yk-halfDy), wherein (xk, yk) is the coordinate of the CPMV, and halfDx is half the width of the block and halfDy is half the height of the block. Examples of halfDx and halfDy: 2, 4, 8, et al. An upper bound threshold may be set for halfDx and halfDy, for example 8, to limit the size of the block that is being used in the regular DMVR search.

The input and output of the process are the CPMVs of both prediction directions, denoted as mvAffineInit[i][k] and mvAffineBest[i][k], wherein I=0, 1 represents the index of prediction direction, and k=0, 1, 2 represents the index of the CPMV. The following applies for k=0, 1, 2.

Video encoder 200 and video decoder 300 may be configured to perform regular DMVR for the representative block k using mvAffineInit[i][k], I=0, 1 as input and the output is cpmv[i][k]. cpmv[0][k]=mvAffineInit [0][k]+mvOffset[k], cpmv[1][k]=mvAffineInit [1][k]−mvOffset[k].

After each CPMV is refined independently, video encoder 200 and video decoder 300 may use both mvAffineInit[i][k] and cpmv[i][k] as candidates for the CPMV k, with mvAffineBest[i][k] being set equal to the best combination of those candidates that generate the minimum BM cost for the current block. The following pseudo code is an example of the process:

```
Set cpmvCand[i][k][0] = mvAffineInit[i][k], and cpmvCand[i][k][1] =
cpmv[i][k], for all I = 0, 1 and k = 0, 1, 2.
Set minCost equal to a predefined maximum value (max 64 bits integer
value for example)
Loop cpmvIdx0 from 0 to 1
    Loop cpmvIdx1 from 0 to 1
        Loop cpmvIdx2 from 0 to 1
            cpmvTemp[i][0] is set equal to cpmvCand[i][0][cpmvIdx0] for
            I = 0, 1
            cpmvTemp[i][1] is set equal to cpmvCand[i][1][cpmvIdx1] for
            I = 0, 1
            cpmvTemp[i][2] is set equal to cpmvCand[i][2][cpmvIdx2] for
            I = 0, 1
            Calculate BM cost, denoted as costTemp, for the current block
            using cpmvTemp[i][k], I = 0, 1, k = 0, 1, 2.
            If costTemp is less than minCost
                minCost is set equal to costTemp, and mvAffineBest[i][k] is
                equal cpmvTemp[i][k], I = 0, 1, k = 0, 1, 2
```

Video encoder 200 and video decoder 300 may be configured to perform affine DMVR CPMV refinement. Video encoder 200 and video decoder 300 may iteratively refine CPMVs to minimize the BM cost of a current block. In one iteration, the process loops over all the CPMVs and refines a current CPMV while keeping the others unchanged. Different MV offsets are added to the current CPMV that is being refined to search for the best offset, and the best offsets are being searched for each of the CPMVs. The input and output of the process are the CPMVs of both prediction directions, denoted as mvAffineInit[i][k] and mvAffineBest [i][k], wherein I=0, 1 represents the index of prediction direction, and k=0, 1, 2 represents the index of the CPMV.

The following pseudo code is an example of one iteration of all CPMVs:

```
mvOffset[j], j = 0, 1, ..., N−1 is an array of possible offset for the CPMV.
Set minCost equal to a predefined maximum value (max 64 bits integer
value for example) mvAffineBest[i][k] is set equal to mvAffineInit[i][k]
for I = 0, 1, k = 0, 1, 2.
Loop over CPMV k, k = 0, 1, 2
    cpmvTemp[i][0] is set equal to mvAffineBest[i][0][cpmvIdx0] for
    I = 0, 1
    cpmvTemp[i][1] is set equal to mvAffineBest[i][1][cpmvIdx1] for
    I = 0, 1
    cpmvTemp[i][2] is set equal to mvAffineBest[i][2][cpmvIdx1] for
    I = 0, 1
    Loop over mvOffset[j], 0, 1, ..., N−1
        cpmvTemp[0][k] is set equal to cpmvTemp[0][k]+mvOffset[j]
        cpmvTemp[1][k] is set equal to cpmvTemp[1][k]−mvOffset[j]
        Calculate BM cost, denoted as costTemp, for the current block using
        cpmvTemp[i][k], I = 0, 1, k = 0, 1, 2.
        If costTemp is less than minCost
            minCost is set equal to costTemp, and mvAffineBest[i][k] is
            equal cpmvTemp[i][k], I = 0, 1, k = 0, 1, 2
if all the CPMVs do not change during one iteration, then the process
stops.
```

Various affine DMVR refinement processes have been introduced above. Each of these processes can produce refined CPMVs for given input CPMVs. Therefore, when these processes are used together in refining the CPMVs, the processes can either be performed cascaded or in parallel.

Figure 6:
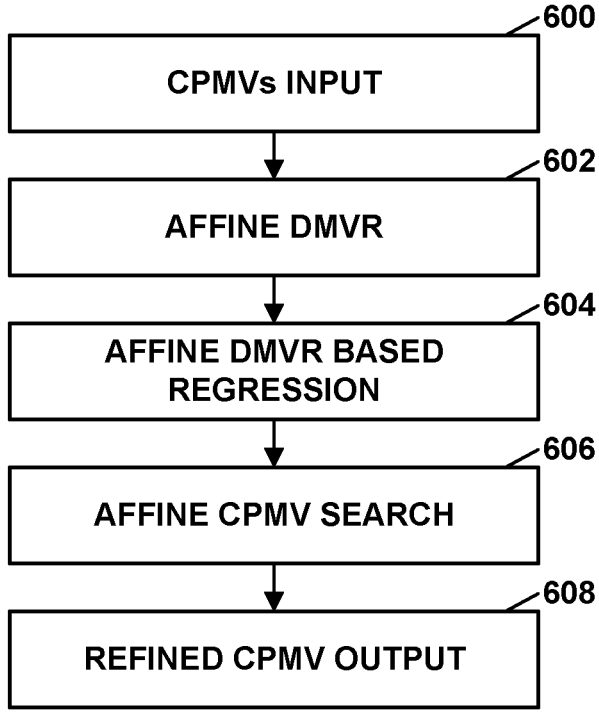
FIG. 6 shows an example of cascaded processing of several affine decoder-side motion vector refinement (DMVR) processes.

When being performed in a cascaded manner, the output from one refinement process can be used as the input to another refinement process. In contrast, when being performed in parallel, one refinement process may be performed independently of, e.g., without relying on any output of, another refinement process. The sequence in performing each of the refinement processes can be in any order. Not necessarily all the refinement processes need to be included because, for example, after a few refinement processes are applied in a row, a refined result with desired performance may have already been identified. In some examples, the affine DMVR as described above for affine merge mode, also referred to herein as BM-based affine DMVR, may be applied first. After that, the regression-based affine DMVR process, such as the one described above, follows. Finally, the affine DMVR CPMV search process, such as the one described above, is performed. A diagram for this example is shown in FIG. 6. Other possible subsets among all affine DMVR processes are also possible.

In the example of FIG. 6, video decoder 300 determines initial CPMVs to serve as inputs for a refinement process (600). Video decoder 300 then refines the initial CPMVs by performing bilateral matching-based affine DMVR (602), affine DMVR based regression (604), and affine CPMV search (606). By performing the refinement process, video decoder 300 determined refined CPMVs (608). In the refinement process, affine DMVR (602), affine DMVR based regression (604), and affine CPMV search (606) are performed serially, with the output of one process providing the input for another process.

In yet another example, to better refine the input CPMVs, all the refinement processes may be included. The regular DMVR as described above may first be applied. The regression-based affine DMVR process may then follow. Next, the affine model parameter refinement with affine DMVR may be applied. Then, the affine DMVR CPMV search process may be performed using the output from former step as input. Finally, the affine DMVR CPMV refinement process is used to derive the final refined CPMVs. An illustration diagram is shown in FIG. 7.

Figure 7:
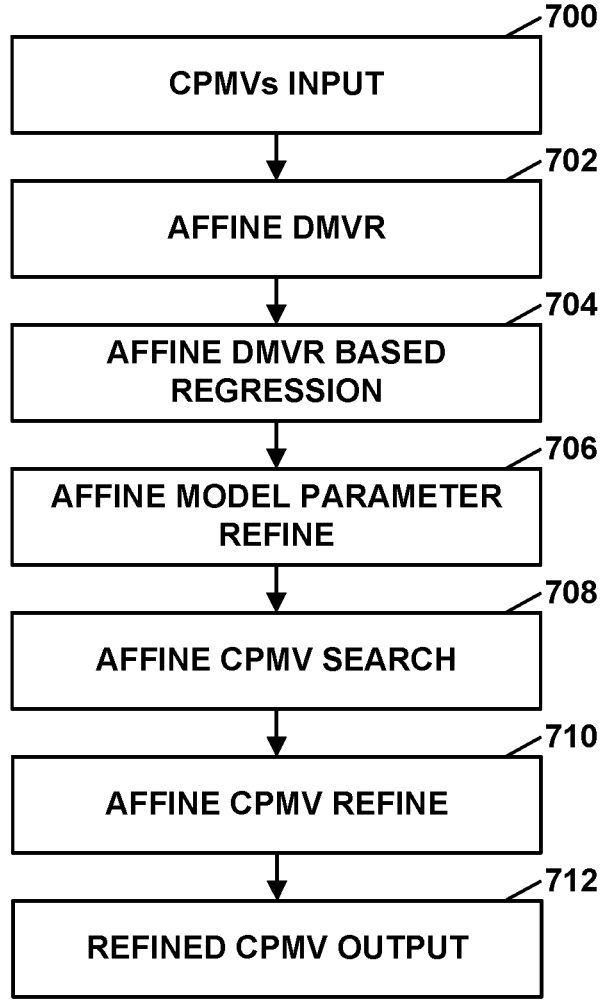
FIG. 7 shows an example of a cascaded processing of all affine DMVR processes.

In the example of FIG. 7, video decoder 300 determines initial CPMVs to serve as inputs for a refinement process (700). Video decoder 300 then refines the initial CPMVs by performing bilateral matching-based affine DMVR (702), affine DMVR based regression (704), affine model parameter refinement (706), affine CPMV search (708), and affine CPMV refinement. By performing the refinement process, video decoder 300 determines refined CPMVs (712). In the refinement process, affine DMVR (702), affine DMVR based regression (704), affine model parameter refinement (706), affine CPMV search (708), and affine CPMV refinement (710) are performed serially, with the output of one process providing the input for another process. This example is just one example on how these refinement processes can be performed sequentially. Any other possible orders of refinement are also applicable.

As each of the refinement process are independent, instead of being performed cascaded, these refinement processes may also be performed in parallel, e.g., at the same time or overlapping in time. This means that all these refinement processes may use the same initial CPMV as input and output different refined CPMVs depending on the refinement processes. Then, certain criterion, for example a BM cost, may be used to decide the best CPMVs refinement result among all the processes and be used as the final refinement output.

Figure 8:
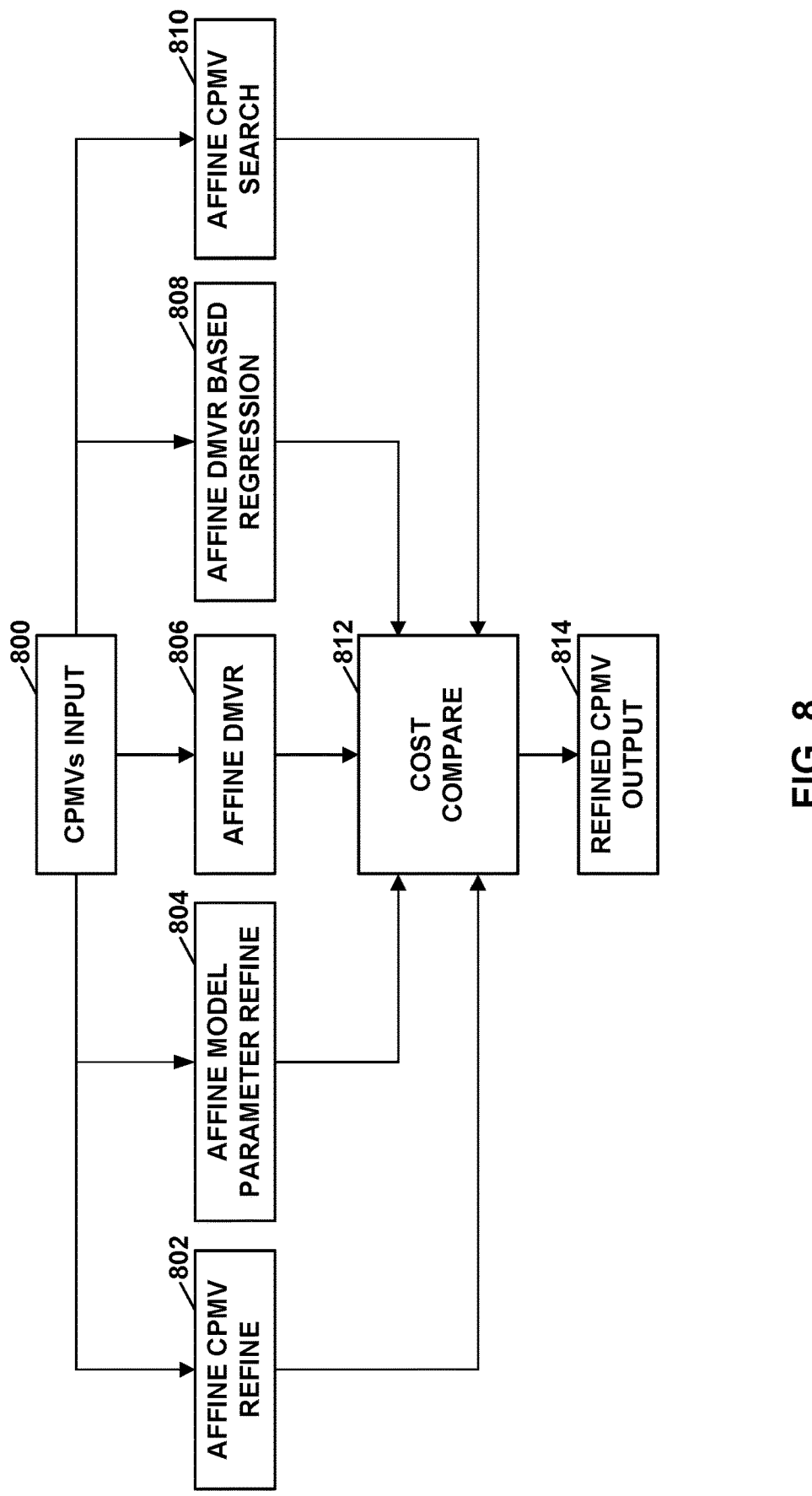
FIG. 8 shows an example of parallel processing of all affine DMVR processes.

An illustration of parallel processing is shown in FIG. 8. In the example of FIG. 8, video decoder 300 determines initial CPMVs to serve as inputs for a refinement process (800). Video decoder 300 then refines the initial CPMVs by performing affine CPMV refinement (802), affine model parameter refinement (804), affine DMVR (806), affine DMVR based regression (808), and affine CPMV search (810) independently and may be performed in parallel. That is, the initial CPMVs are used as inputs for all of affine CPMV refinement (802), affine model parameter refinement (804), bilateral matching-based affine DMVR (806), affine DMVR based regression (808), and affine CPMV search (810), and the outputs of one refinement process is not needed for the other refinement process. Video decoder 300 then performs a cost comparison (812) to select one of the outputs of affine CPMV refinement, affine model parameter refinement, affine DMVR, affine DMVR based regression, and affine CPMV search to use as the refined CPMV output (814).

The parallel processing may be relatively hardware friendly because compared to the cascaded design, each of the refinement processes may be done simultaneously. Different refinement processes can also give different outcomes which also improves the output varieties that may provide similar performance as the cascaded refinement.

A hybrid scheme may also be used in combining different refinement processes. For example, a regression-based affine DMVR process may require the best subblock motion vectors for each of the subblocks, which can be derived during the regular subblock-based affine DMVR process. Therefore, the affine DMVR and regression-based affine DMVR processes may benefit from being applied in a cascaded manner. Also, the CPMV search and CPMV refinement processes may be used together, as both processes refine each of the CPMVs independently. The other processes that refine the affine model parameters may be unique and implemented in a stand alone manner. In this way, in one example, these different affine DMVR processes are divided into three groups. Between the different groups, the refinement processes are applied in parallel. However, within the same group, the refinement processes may be performed in a cascaded manner.

Figure 9:
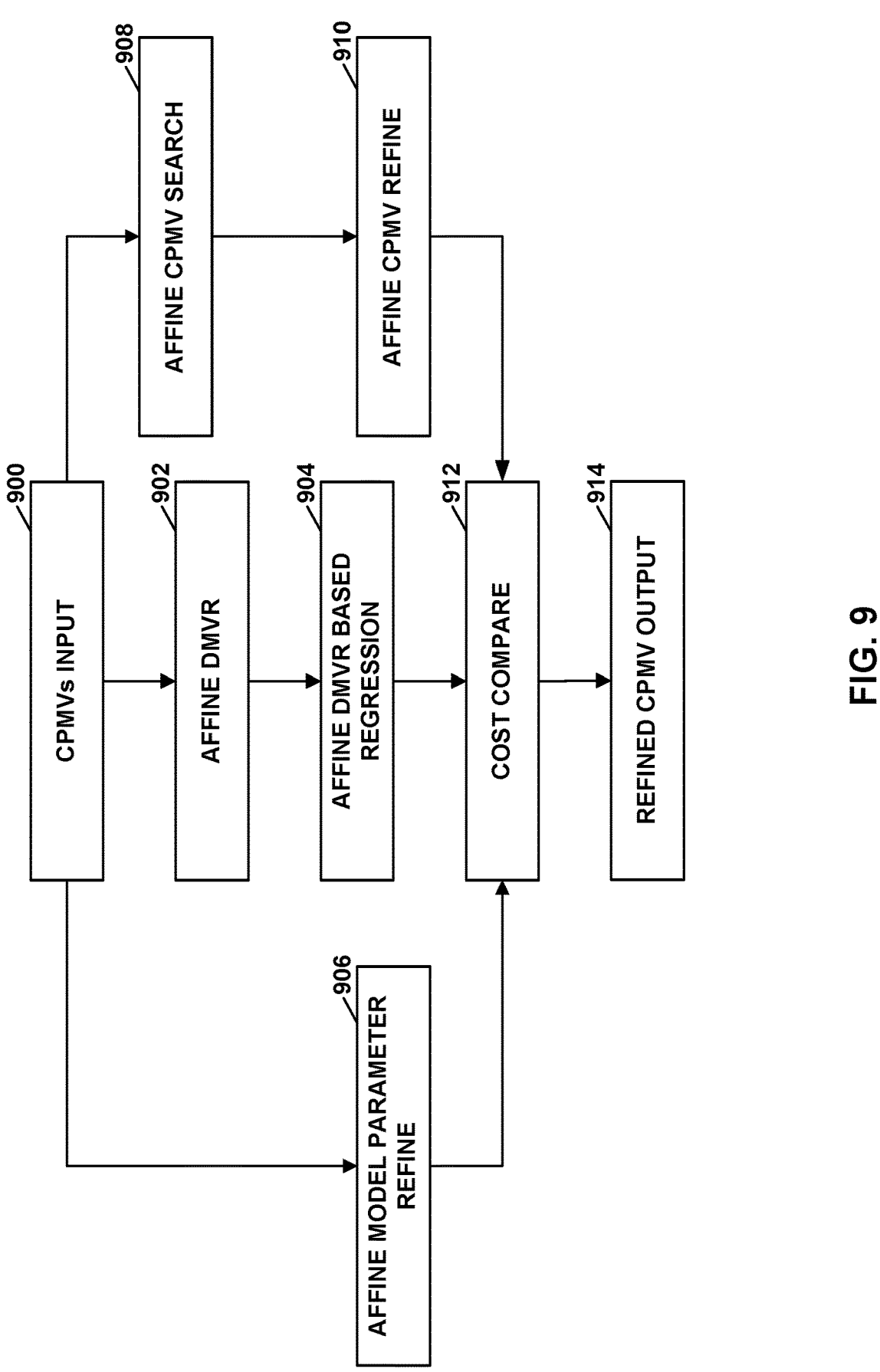
FIG. 9 shows an example of a hybrid combination of all affine DMVR processes.

An example of a hybrid scheme is shown in FIG. 9. In the example of FIG. 9, video decoder 300 determines initial CPMVs to serve as inputs for a refinement process (900). Video decoder 300 then performs a first refinement on the initial CPMVs by performing bilateral matching-based affine DMVR (902) and affine DMVR based regression (904) sequentially. That is, the output of affine DMVR (902) is an input to the DMVR based regression process (904). Independent of the first refinement, video decoder 300 performs a second refinement by performing affine model parameter refinement (906). Independent of the first refinement and the second refinement, video decoder 300 performs a third refinement by performing affine CPMV search (908) and affine CPMV refinement (910) sequentially. Video decoder 300 then performs a cost comparison (912) to select one of the outputs of the three refinements to use as the refined CPMV output (914).

There may be multiple other ways in grouping the refinement processes, however, the general idea here is that a hybrid scheme with some of the refinement processes being performed cascaded while in parallel with the other refinement processes can be used.

Not necessarily all of the affine DMVR processes need to be utilized. For example, affine model parameter refine may not be used, as shown in the example of FIG. 10.

Figure 10:
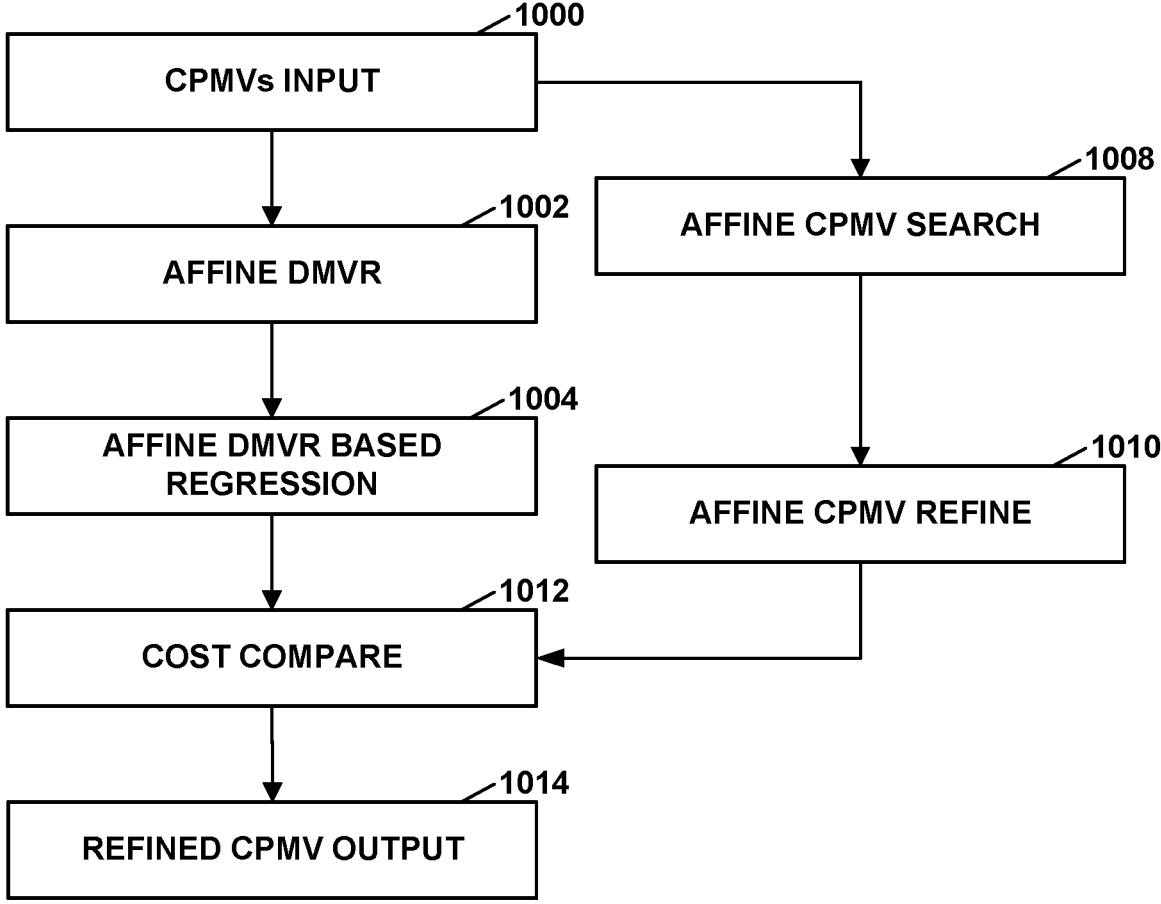
FIG. 10 shows an example of a simplified hybrid combination of affine DMVR processes.

In the example of FIG. 10, video decoder 300 determines initial CPMVs to serve as inputs for a refinement process (1000). Video decoder 300 then performs a first refinement on the initial CPMVs by performing bilateral matching-based affine DMVR (1002) and affine DMVR based regression (1004) sequentially. Independent of the first refinement, video decoder 300 performs a second refinement by performing affine CPMV search (1008) and affine CPMV refinement (1010) sequentially. Video decoder 300 then performs a cost comparison (1012) to select one of the outputs of the two refinements to use as the refined CPMV output (1014).

Figure 11:
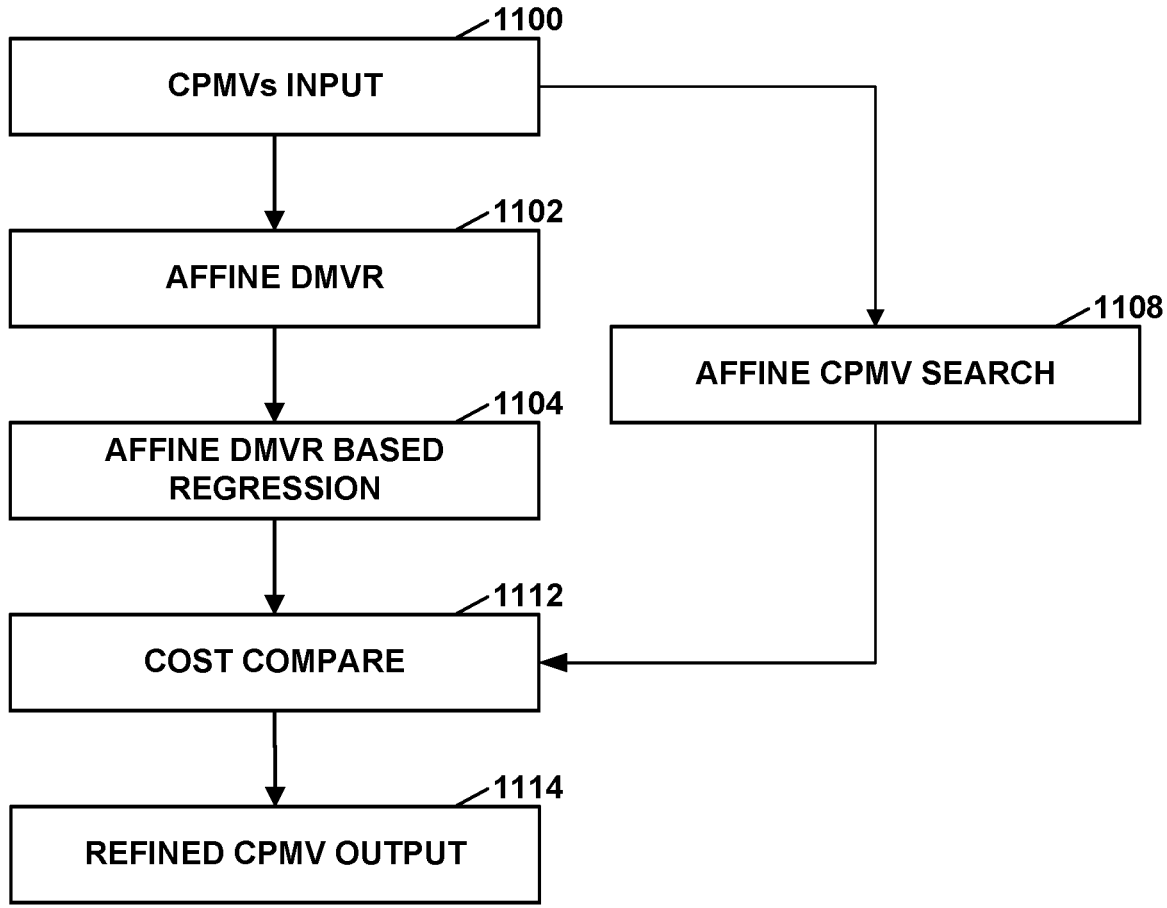
FIG. 11 shows an example of a further simplified hybrid combination of affine DMVR processes.

In yet another example, a further simplified scheme is provided where the affine CPMV refine is also excluded, as in the example of FIG. 11. In the example of FIG. 11, video decoder 300 determines initial CPMVs to serve as inputs for a refinement process (1100). Video decoder 300 then performs a first refinement on the initial CPMVs by performing bilateral matching-based affine DMVR (1102) and affine DMVR based regression (1104) sequentially. Independent of the first refinement, video decoder 300 performs a second refinement by performing affine CPMV search (1108). Video decoder 300 then performs a cost comparison (1112) to select one of the outputs of the two refinements to use as the refined CPMV output (1114).

Figure 12:
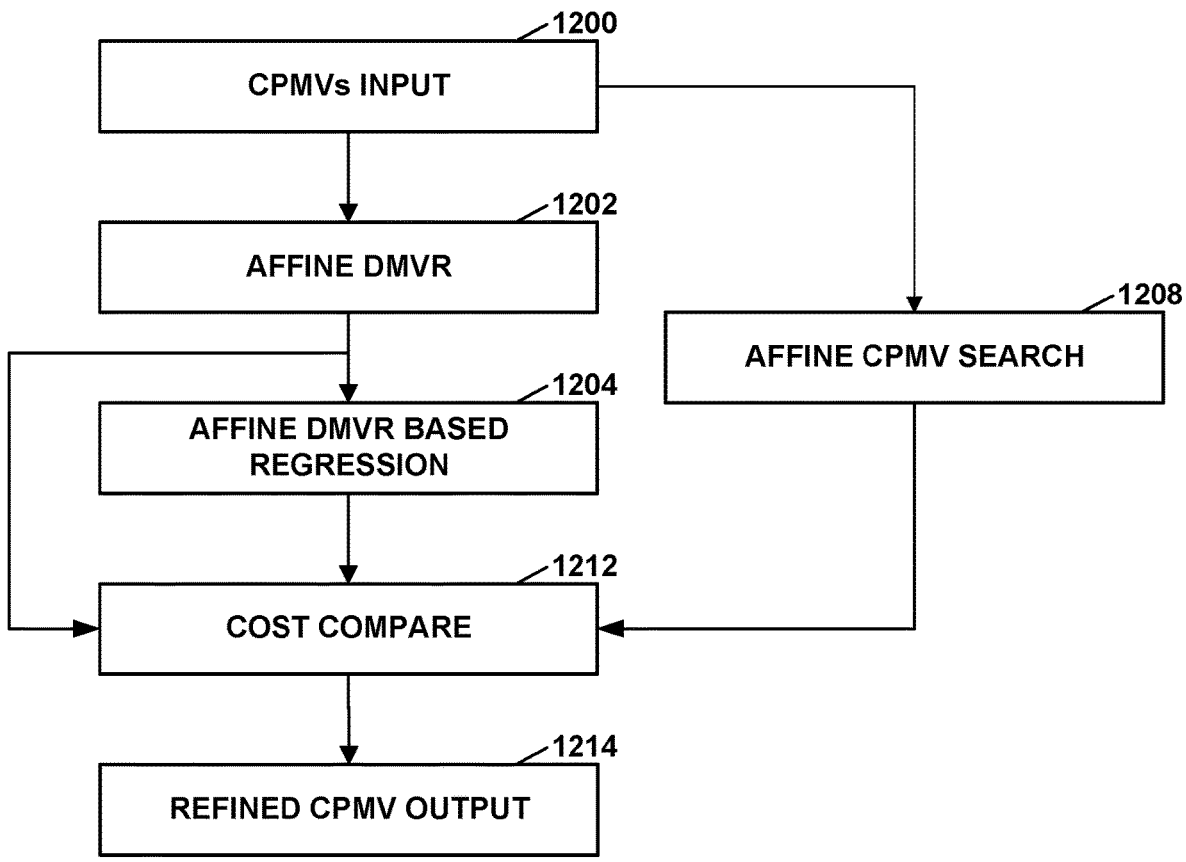
FIG. 12 shows an example of an intermediate result considered as a final output.

Not only the final output from a branch, but also some of the intermediate result can be used in the final cost comparison stage to decide on the best output. In one example, the affine DMVR output is additionally considered in the cost compare, as shown in FIG. 12. In the example of FIG. 12, video decoder 300 determines initial CPMVs to serve as inputs for a refinement process (1200). Video decoder 300 then performs a first refinement on the initial CPMVs by performing bilateral matching-based affine DMVR (1202) and affine DMVR based regression (1204) sequentially. Independent of the first refinement, video decoder 300 performs a second refinement by performing affine CPMV search (1208). Video decoder 300 then performs a cost comparison (1212) to select one of the outputs of the first refinement, the second refinement, or the output of affine DMVR without affine DMVR based regression, to use as the refined CPMV output (1214).

Figure 13:
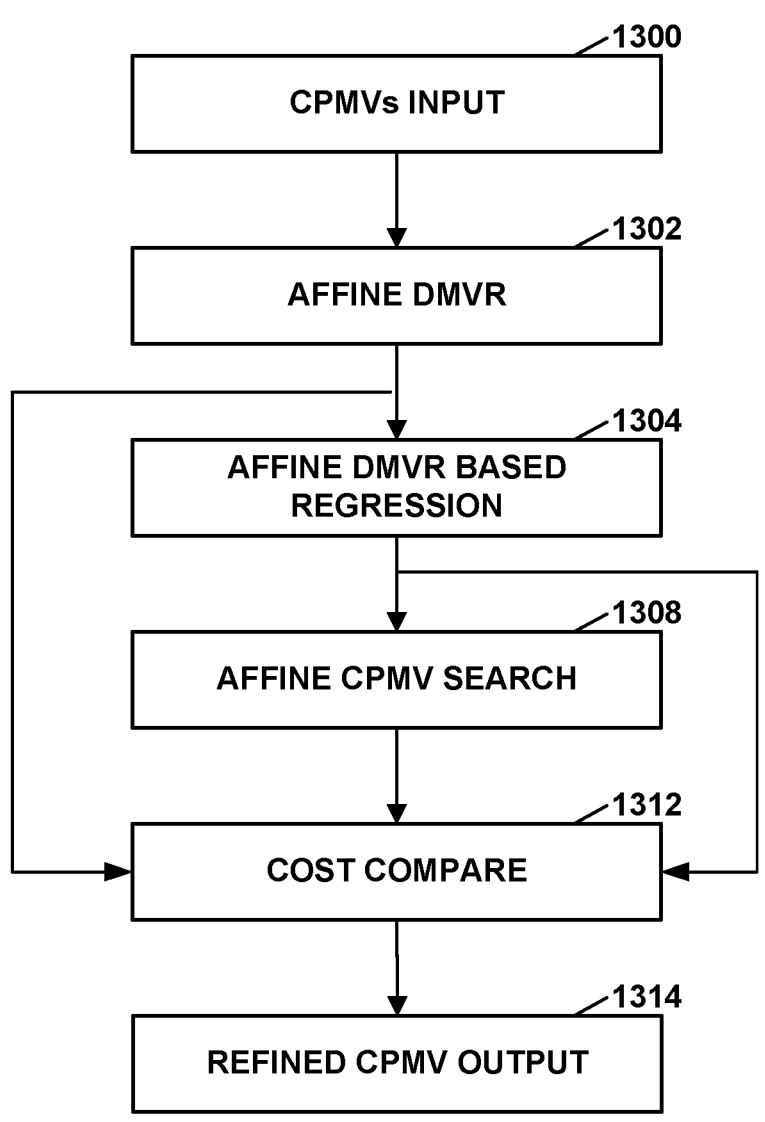
FIG. 13 shows an example of an intermediate result considered as a final output.

The same thing can also apply to the cascaded scheme. In another example, affine CPMV search as show in FIG. 12 is moved after affine DMVR-based regression and both the intermediate results are considered in the cost comparison, as shown in the example of FIG. 13. In the example of FIG. 13, video decoder 300 determines initial CPMVs to serve as inputs for a refinement process (1300). Video decoder 300 then performs a cascaded refinement on the initial CPMVs by performing bilateral matching-based affine DMVR (1302), affine DMVR based regression (1304), and affine CPMV search (1306) sequentially. Video decoder 300 then performs a cost comparison (1312) to select one of the outputs of the cascaded refinement, the output of affine DMVR without affine DMVR based regression and affine CPMV search, or the output affine DMVR based regression without affine CPMV search to use as the refined CPMV output (1314).

Although FIGS. 6-13 have been described as being performed by video decoder 300, it should be understood that the processes of FIGS. 6-13 may be performed by video encoder 200. For example, as part of determining how to encode video data, video encoder 200 may be configured to perform the same decoding techniques that video decoder 300 will use to decode the video data. Other possible combinations of the hybrid scheme can also be solutions in combining various affine DMVR processes. Additionally, among all these possible combinations, some of the intermediate output can also be considered as the final output.

Figure 14:
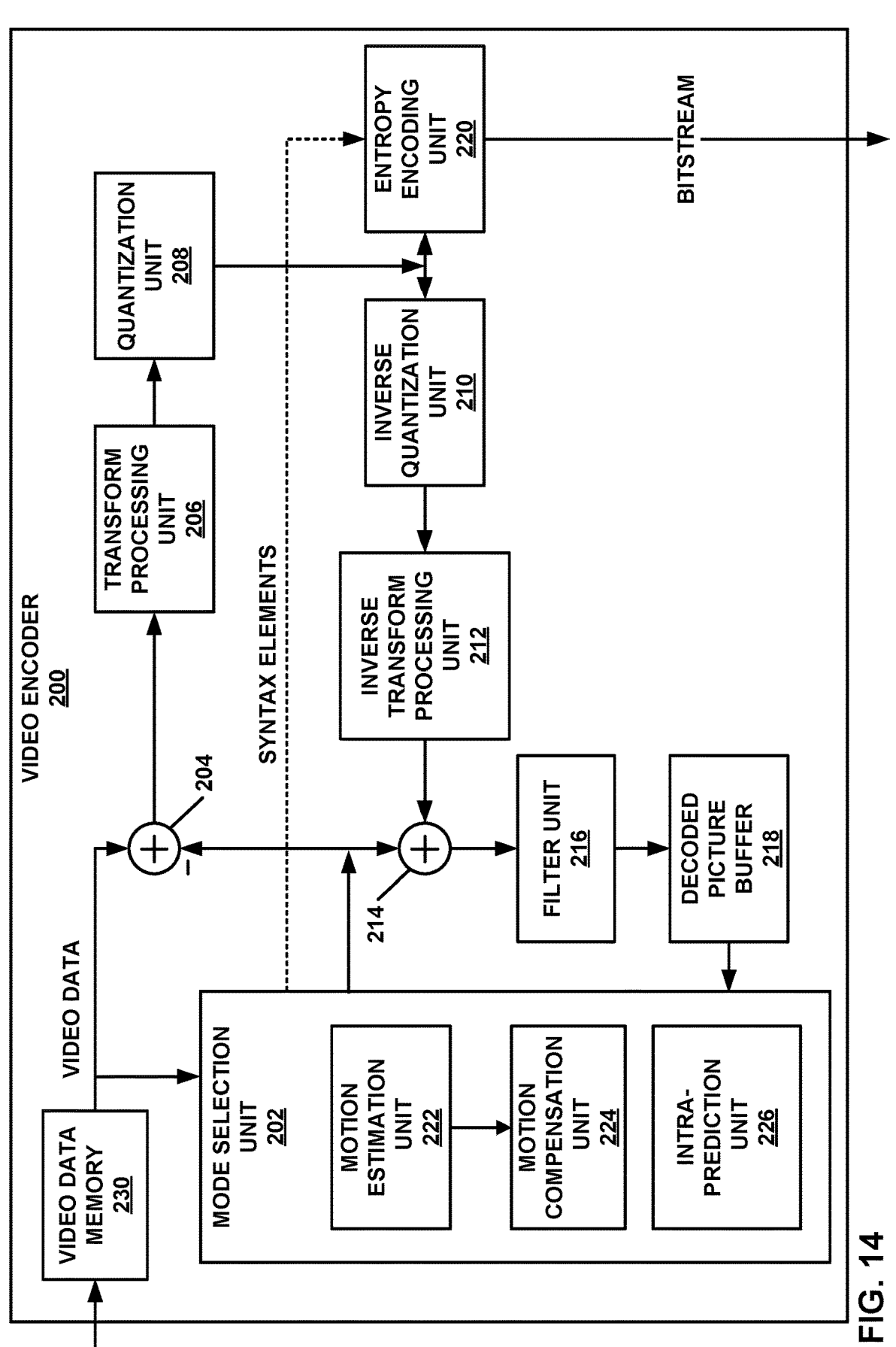
FIG. 14 is a block diagram illustrating an example video encoder that may perform the techniques of this disclosure.

FIG. 14 is a block diagram illustrating an example video encoder 200 that may perform the techniques of this disclosure. FIG. 14 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 14, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 14 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

Motion compensation unit 224 may also be configured to perform affine prediction. In accordance with the techniques of this disclosure, motion compensation unit 224 may be configured to determine that a block of video data is coded in an affine prediction mode; determine a plurality of CPMVs for the affine prediction mode; perform two or more DMVR processes on the CPMVs to determine two or more sets of refined CPMVs; perform a cost comparison between the two or more DMVR processes to select a set of refined CPMVs from the refined CPMVs; and determine a prediction block for the block based on the set of refined CPMVs. Each of the two or more DMVR processes may include a affine DMVR, regression-based DMVR, affine model parameter refinement, affine DMVR CPMV searching, affine DMVR CPMV search refinement, or a combination or permutation thereof.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUS, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that a block of video data is coded in an affine prediction mode; determine a plurality of control point motion vectors (CPMVs) for the affine prediction mode; perform one or more decoder-side motion vector refinement (DMVR) processes on the CPMVs to determine refined CPMVs; and determine a prediction block for the block based on the refined CPMVs.

Figure 15:
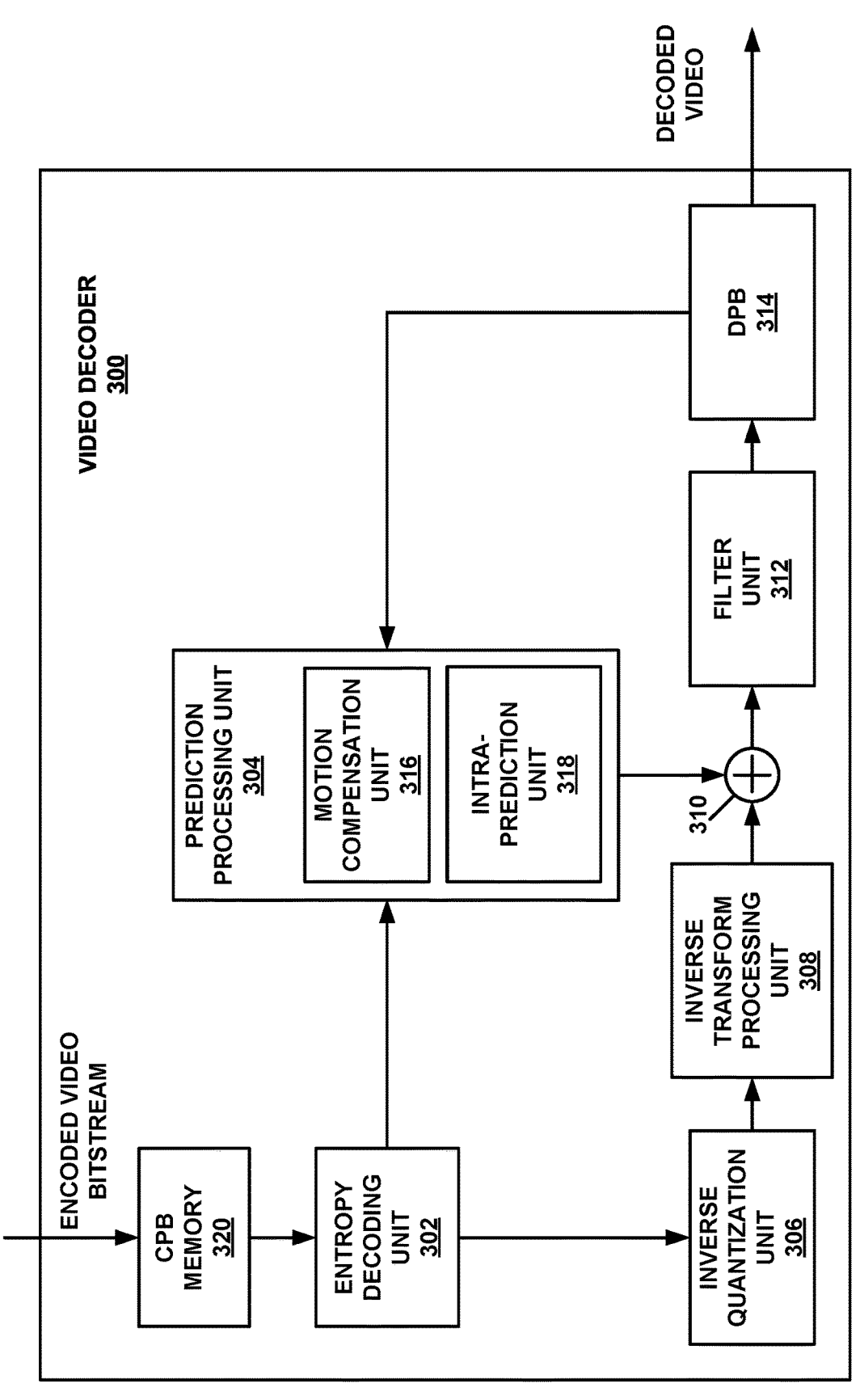
FIG. 15 is a block diagram illustrating an example video decoder that may perform the techniques of this disclosure.

FIG. 15 is a block diagram illustrating an example video decoder 300 that may perform the techniques of this disclosure. FIG. 15 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 15, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 15 are illustrated to assist with understanding the operations performed by video decoder 300. The units may be implemented as fixed-function circuits, programmable circuits, or a combination thereof. Similar to FIG. 14, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 14).

Motion compensation unit 316 may also be configured to perform affine prediction. In accordance with the techniques of this disclosure, motion compensation unit 316 may be configured to determine that a block of video data is coded in an affine prediction mode; determine a plurality of CPMVs for the affine prediction mode; perform two or more DMVR processes on the CPMVs to determine two or more sets of refined CPMVs; perform a cost comparison between the two or more DMVR processes to select a set of refined CPMVs from the refined CPMVs; and determine a prediction block for the block based on the set of refined CPMVs. Each of the two or more DMVR processes may include a affine DMVR, regression-based DMVR, affine model parameter refinement, affine DMVR CPMV searching, affine DMVR CPMV search refinement, or a combination or permutation thereof.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 14). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine that a block of video data is coded in an affine prediction mode; determine a plurality of control point motion vectors (CPMVs) for the affine prediction mode; perform one or more decoder-side motion vector refinement (DMVR) processes on the CPMVs to determine refined CPMVs; and determine a prediction block for the block based on the refined CPMVs.

Figure 16:
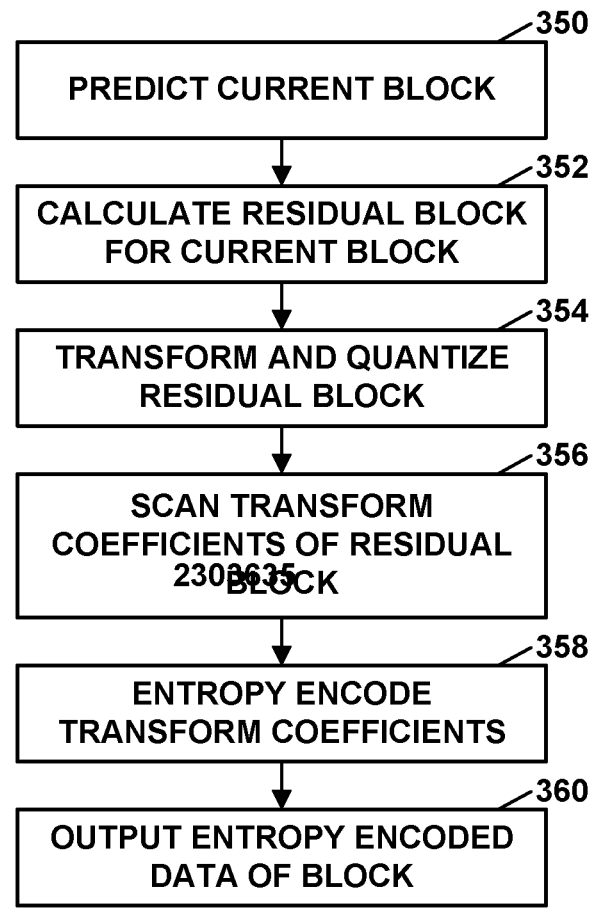
FIG. 16 is a flowchart illustrating an example process for encoding a current block in accordance with the techniques of this disclosure.

FIG. 16 is a flowchart illustrating an example process for encoding a current block in accordance with the techniques of this disclosure. The current block may be or include a current CU. Although described with respect to video encoder 200 (FIGS. 1 and 14), it should be understood that other devices may be configured to perform a process similar to that of FIG. 16.

In this example, video encoder 200 initially predicts the current block (350). For example, video encoder 200 may form a prediction block for the current block. As part of forming the prediction block, video encoder 200 may, for example, perform the affine DMVR techniques described in this disclosure. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 17:
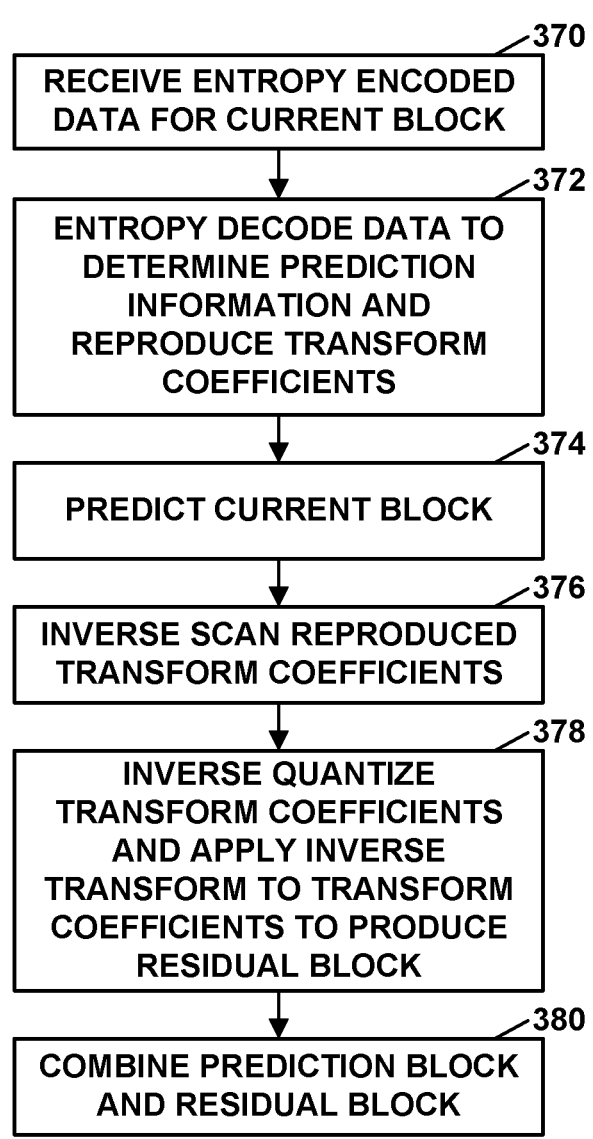
FIG. 17 is a flowchart illustrating an example process for decoding a current block in accordance with the techniques of this disclosure.

FIG. 17 is a flowchart illustrating an example process for decoding a current block of video data in accordance with the techniques of this disclosure. The current block may be or include a current CU. Although described with respect to video decoder 300 (FIGS. 1 and 15), it should be understood that other devices may be configured to perform a process similar to that of FIG. 17.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. For blocks coded using an affine inter-mode, video decoder 300 may use the affine DMVR techniques described herein to determine the prediction block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

The following numbered clauses illustrate one or more aspects of the devices and techniques described in this disclosure.

Clause 1A: A method of coding video data, the method comprising: determining that a block of video data is coded in an affine prediction mode; determining a plurality of control point motion vectors (CPMVs) for the affine prediction mode; performing one or more decoder-side motion vector refinement (DMVR) processes on the CPMVs to determine refined CPMVs; and determining a prediction block for the block based on the refined CPMVs.

Clause 2A: The method of clause 1A, wherein performing the one or more DMVR processes on the CPMVs to determine the refined CPMVs comprises: performing one or more of affine DMVR, regression-based DMVR, affine model parameter refinement, affine DMVR CPMV searching, or affine DMVR CPMV search refinement.

Clause 3A: The method of clause 2A, wherein performing the one or more DMVR processes on the CPMVs to determine the refined CPMVs comprises: performing a cost comparison between two or more of the affine DMVR, the regression-based DMVR, the affine model parameter refinement, the affine DMVR CPMV searching, or the affine DMVR CPMV search refinement to determine the refined CPMVs.

Clause 4A: The method of clause 2A, wherein performing the one or more DMVR processes on the CPMVs to determine the refined CPMVs comprises: using an output of one of the affine DMVR, the regression-based DMVR, the affine model parameter refinement, the affine DMVR CPMV searching, or the affine DMVR CPMV search refinement to determine the refined CPMVs and input for a different one of the affine DMVR, the regression-based DMVR, the affine model parameter refinement, the affine DMVR CPMV searching, or the affine DMVR CPMV search refinement to determine the refined CPMVs.

Clause 5A: The method of any of clauses 1A-4A, wherein performing the one or more DMVR processes on the CPMVs to determine the refined CPMVs comprises performing two or more DMVR processes in parallel.

Clause 6A: The method of any of clauses 1A-5A, wherein coding comprises decoding.

Clause 7A: The method of any of clauses 1A-5A, wherein coding comprises encoding.

Clause 8A: A device for coding video data, the device comprising one or more means for performing the method of any of clauses 1A-7A.

Clause 9A: The device of clause 8A, wherein the one or more means comprise one or more processors implemented in circuitry.

Clause 10A: The device of any of clauses 8A and 9A, further comprising a memory to store the video data.

Clause 11A: The device of any of clauses 8A-10A, further comprising a display configured to display decoded video data.

Clause 12A: The device of any of clauses 8A-11A, wherein the device comprises one or more of a camera, a computer, a mobile device, a broadcast receiver device, or a set-top box.

Clause 13A: The device of any of clauses 8A-12A, wherein the device comprises a video decoder.

Clause 14A: The device of any of clauses 8A-13A, wherein the device comprises a video encoder.

Clause 15A: A computer-readable storage medium having stored thereon instructions that, when executed, cause one or more processors to perform the method of any of clauses 1A-7A.

Clause 16A: A device for coding video data, the method comprising: means for determining that a block of video data is coded in an affine prediction mode; means for determining a plurality of control point motion vectors (CPMVs) for the affine prediction mode; means for performing one or more decoder-side motion vector refinement (DMVR) processes on the CPMVs to determine refined CPMVs; and means for determining a prediction block for the block based on the refined CPMVs.

Clause 1B: A method of decoding video data, the method comprising: determining that a block of the video data is coded in an affine prediction mode; determining a plurality of control point motion vectors (CPMVs) for the affine prediction mode; performing two or more DMVR processes on the CPMVs to determine two or more sets of refined CPMVs, wherein performing the two or more DMVR processes on the CPMVs to determine the two or more sets of refined CPMVs comprises performing two or more of bilateral matching-based affine DMVR, regression-based DMVR, affine model parameter refinement, affine DMVR CPMV searching, or affine DMVR CPMV search refinement; performing a cost comparison between the two or more DMVR processes to select a set of refined CPMVs from the refined CPMVs; and determining a prediction block for the block based on the set of refined CPMVs.

Clause 2B: The method of clause 1B, wherein a first DMVR process of the two or more DMVR processes comprises performing the bilateral matching-based affine DMVR sequentially with the regression-based affine DMVR.

Clause 3B: The method of clause 2B, wherein a second DMVR process of the two or more DMVR processes comprises performing the affine CPMV search.

Clause 4B: The method of clause 3B, wherein the second DMVR process comprises performing the affine DMVR CPMV search refinement sequentially with the affine CPMV search.

Clause 5B: The method of any of clause 2B-4B, wherein the two or more DMVR processes comprises at least three DMVR processes, and wherein a third DMVR process comprises performing the affine model parameter refinement.

Clause 6B: The method of any of clauses 1B-5B, wherein performing the cost comparison between the two or more DMVR processes comprises determining a bilateral matching cost for each of the two or more DMVR processes.

Clause 7B: The method of any of clauses 1B-6B, wherein performing two or more DMVR processes on the CPMVs to determine two or more sets of refined CPMVs comprises performing two or more of the bilateral matching-based affine DMVR, the regression-based DMVR, the affine model parameter refinement, the affine DMVR CPMV searching, or the affine DMVR CPMV search refinement in parallel and performing two or more of the bilateral matching-based affine DMVR, the regression-based DMVR, the affine model parameter refinement, the affine DMVR CPMV searching, or the affine DMVR CPMV search refinement sequentially.

Clause 8B: The method of any of clauses 1B-7B, wherein the method of decoding is performed as part of a video encoding process.

Clause 9B: A device for decoding video data, the device comprising: a memory configured to store video data; one or more processors implemented in circuitry and configured to: determine that a block of the video data is coded in an affine prediction mode; determine a plurality of control point motion vectors (CPMVs) for the affine prediction mode; perform two or more DMVR processes on the CPMVs to determine two or more sets of refined CPMVs, wherein to performing the two or more DMVR processes on the CPMVs to determine the two or more sets of refined CPMVs, the one or more processors are further configured to perform two or more of bilateral matching-based affine DMVR, regression-based DMVR, affine model parameter refinement, affine DMVR CPMV searching, or affine DMVR CPMV search refinement; perform a cost comparison between the two or more DMVR processes to select a set of refined CPMVs from the refined CPMVs; and determine a prediction block for the block based on the set of refined CPMVs.

Clause 10B: The device of clause 9B, wherein a first DMVR process of the two or more DMVR processes comprises performing the bilateral matching-based affine DMVR sequentially with the regression-based affine DMVR.

Clause 11B: The device of clause 10B, wherein a second DMVR process of the two or more DMVR processes comprises performing the affine CPMV search.

Clause 12B: The device of clause 11B, wherein the second DMVR process comprises performing the affine DMVR CPMV search refinement sequentially with the affine CPMV search.

Clause 13B: The device of any of clauses 10B-12B, wherein the two or more DMVR processes comprises at least three DMVR processes, and wherein a third DMVR process comprises performing the affine model parameter refinement.

Clause 14B: The device of any of clauses 9B-13B, wherein to performing the cost comparison between the two or more DMVR processes, the one or more processors are further configured to determine a bilateral matching cost for each of the two or more DMVR processes.

Clause 15B: The device of any of clauses 9B-14B, wherein to perform two or more DMVR processes on the CPMVs to determine two or more sets of refined CPMVs, the one or more processors are further configured to perform two or more of the bilateral matching-based affine DMVR, the regression-based DMVR, the affine model parameter refinement, the affine DMVR CPMV searching, or the affine DMVR CPMV search refinement in parallel and perform two or more of the bilateral matching-based affine DMVR, the regression-based DMVR, the affine model parameter refinement, the affine DMVR CPMV searching, or the affine DMVR CPMV search refinement sequentially.

Clause 16B: The device of any of clauses 9B-15B, wherein the device comprises a video decoding device.

Clause 17B: The device of any of clauses 9B-16B, wherein the device comprises a video encoding device.

Clause 18B: The device of any of clauses 9B-17B, further comprising a display configured to display decoded video data.

Clause 19B: The device of any of clauses 9B-18B, wherein the device comprises one or more of a camera, a computer, a mobile device, a broadcast receiver device, or a set-top box.

Clause 20B: A computer-readable storage medium storing instructions that when executed by one or more processors cause the one or more processors to: determine that a block of video data is coded in an affine prediction mode; determine a plurality of control point motion vectors (CPMVs) for the affine prediction mode; perform two or more DMVR processes on the CPMVs to determine two or more sets of refined CPMVs, wherein to performing the two or more DMVR processes on the CPMVs to determine the two or more sets of refined CPMVs, the one or more processors are further configured to perform two or more of bilateral matching-based affine DMVR, regression-based DMVR, affine model parameter refinement, affine DMVR CPMV searching, or affine DMVR CPMV search refinement; perform a cost comparison between the two or more DMVR processes to select a set of refined CPMVs from the refined CPMVs; and determine a prediction block for the block based on the set of refined CPMVs.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a block of the video data is coded in an affine prediction mode;
   determining a plurality of control point motion vectors (CPMVs) for the affine prediction mode;
   performing a first decoder-side motion vector refinement (DMVR) process on the plurality of CPMVs to determine a first set of refined CPMVs associated with a first cost;
   performing, in parallel to the performance of the first DMVR process, a second DMVR process on the plurality of CPMVs to determine a second set of refined CPMVs associated with a second cost, the second DMVR process being different from the first DMVR process;
   selecting, based on a cost comparison between the first cost and the second cost, the first set of refined CPMVs or the second set of refined CPMVs to determine a selected set of refined CPMVs; and
   determining a prediction block for the block based on the selected set of refined CPMVs.

2. The method of claim 1, wherein performing the first DMVR process comprises performing bilateral matching-based affine DMVR sequentially with regression-based affine DMVR.

3. The method of claim 2, wherein performing the second DMVR process comprises performing affine CPMV search.

4. The method of claim 3, wherein performing the second DMVR process comprises performing affine DMVR CPMV search refinement sequentially with the affine CPMV search.

5. The method of claim 2, further comprising performing a third DMVR process, the third DMVR process being affine model parameter refinement.

6. The method of claim 1, further comprising determining a respective bilateral matching cost for the first DMVR process and the second DMVR process.

7. The method of claim 1, further comprising:
   performing a third DMVR process sequentially with at least one of the first DMVR process or the second DMVR process; or
   performing the third DMVR process sequentially with a fourth DMVR process, the fourth DMVR process being different from the first DMVR process and the second DMVR process.

8. The method of claim 1, wherein the method of decoding is performed as part of a video encoding process.

9. A device for decoding video data, the device comprising:

a memory configured to store video data;

one or more processors implemented in circuitry and configured to:

determine that a block of the video data is coded in an affine prediction mode;

determine a plurality of control point motion vectors (CPMVs) for the affine prediction mode;

perform a first decoder-side motion vector refinement (DMVR) process on the plurality of CPMVs to determine a first set of refined CPMVs associated with a first cost;

perform, in parallel to the performance of the first DMVR process, a second DMVR process on the plurality of CPMVs to determine a second set of refined CPMVs associated with a second cost, the second DMVR process being different from the first DMVR process;

select, based on a cost comparison between the first cost and the second cost, the first set of refined CPMVs or the second set of refined CPMVs to determine a selected set of refined CPMVs; and determine a prediction block for the block based on the selected set of refined CPMVs.

10. The device of claim 9, wherein to perform the first DMVR process, the one or more processors are further configured to perform bilateral matching-based affine DMVR sequentially with regression-based affine DMVR.

11. The device of claim 10, wherein to perform the second DMVR process, the one or more processors are further configured to perform affine CPMV search.

12. The device of claim 11, wherein to perform the second DMVR process, the one or more processors are further configured to perform affine DMVR CPMV search refinement sequentially with the affine CPMV search.

13. The device of claim 10, wherein the one or more processors are further configured to perform a third DMVR process, the third DMVR process being affine model parameter refinement.

14. The device of claim 9, wherein the one or more processors are further configured to determine a respective bilateral matching cost for the first DMVR process and the second DMVR process.

15. The device of claim 9, wherein the one or more processors are further configured to:

perform a third DMVR process sequentially with at least one of the first DMVR process or the second DMVR process; or perform the third DMVR process sequentially with a fourth DMVR process, the fourth DMVR process being different from the first DMVR process and the second DMVR process.

16. The device of claim 9, wherein the device comprises a video decoding device.

17. The device of claim 9, wherein the device comprises a video encoding device.

18. The device of claim 9, further comprising a display configured to display decoded video data.

19. The device of claim 9, wherein the device comprises one or more of a camera, a computer, a mobile device, a broadcast receiver device, or a set-top box.

20. A non-transitory, computer-readable storage medium storing instructions that when executed by one or more processors cause the one or more processors to:

determine that a block of video data is coded in an affine prediction mode;

determine a plurality of control point motion vectors (CPMVs) for the affine prediction mode;

perform a first decoder-side motion vector refinement (DMVR) process on the plurality of CPMVs to determine a first set of refined CPMVs associated with a first cost;

perform, in parallel to the performance of the first DMVR process, a second DMVR process on the plurality of CPMVs to determine a second set of refined CPMVs associated with a second cost, the second DMVR process being different from the first DMVR process;

select, based on a cost comparison between the first cost and the second cost, the first set of refined CPMVs or the second set of refined CPMVs to determine a selected set of refined CPMVs; and determine a prediction block for the block based on the selected set of refined CPMVs.

\* \* \* \* \*